(12) United States Patent
Villaume

(10) Patent No.: US 9,832,849 B2
(45) Date of Patent: Nov. 28, 2017

(54) EMERGENCY LIGHT DEVICES, SYSTEMS, AND METHODS

(71) Applicant: Edward Villaume, Minneapolis, MN (US)

(72) Inventor: Edward Villaume, Minneapolis, MN (US)

(*) Notice: Subject to any disclaimer, the term of this patent is extended or adjusted under 35 U.S.C. 154(b) by 0 days.

(21) Appl. No.: 15/179,105

(22) Filed: Jun. 10, 2016

(65) Prior Publication Data

US 2016/0366754 A1    Dec. 15, 2016

Related U.S. Application Data

(60) Provisional application No. 62/174,647, filed on Jun. 12, 2015.

(51) Int. Cl.
| | |
|---|---|
| H05B 37/04 | (2006.01) |
| H05B 33/08 | (2006.01) |
| H05B 37/02 | (2006.01) |
| F21S 9/02 | (2006.01) |
| F21V 21/08 | (2006.01) |
| F21V 23/02 | (2006.01) |
| H02J 9/06 | (2006.01) |
| F21V 23/04 | (2006.01) |

(52) U.S. Cl.
CPC .............. H05B 37/04 (2013.01); F21S 9/022 (2013.01); F21S 9/024 (2013.01); F21V 23/023 (2013.01); F21V 23/0435 (2013.01); H02J 9/06 (2013.01); H05B 33/0857 (2013.01); H05B 37/0272 (2013.01); F21V 21/0832 (2013.01)

(58) Field of Classification Search
CPC H05B 37/04; H05B 33/0857; H05B 37/0272; F21S 9/024; F21V 21/0832; F21V 23/023; H02J 9/06

USPC .......................................................... 315/87
See application file for complete search history.

(56) References Cited

U.S. PATENT DOCUMENTS 6,010,228 A * 1/2000 Blackman ............... F21S 9/022
                                                        362/20
7,938,555 B1 * 5/2011 Kalhofer ................. F21L 4/08
                                                        307/66

(Continued)

FOREIGN PATENT DOCUMENTS

| GB | 2507197 | 4/2014 | |
| GB | 2507197 A * | 4/2014 | ............. H02J 9/065 |

OTHER PUBLICATIONS

International Search Report and Written Opinion issued in PCT/US2016/37048, dated Aug. 26, 2016, 8 pages.

*Primary Examiner* — Dylan White
(74) *Attorney, Agent, or Firm* — Hamere, Schumann, Mueller & Larson, P.C.

(57) ABSTRACT

Emergency light devices, systems and methods that provide instant light in a power outage or other situations. One or more sensors monitor the flow of electricity, and when the flow of electricity is stopped or no longer present, an emergency light device power monitoring device instantly communicates via wireless communication technology to emergency light device(s) to instantly turn on the emergency light device(s). The emergency light device(s) can be a portable and/or permanent unit of varying shapes and sizes, and can be attached to any object, or may stand alone, with some or all of its parts being replaceable, interchangeable, or upgradeable.

21 Claims, 21 Drawing Sheets

(56) References Cited

U.S. PATENT DOCUMENTS

| | | | |
|---|---|---|---|
| 8,614,549 B2* | 12/2013 | Chang | H05B 33/0842 |
| | | | 315/160 |
| 8,702,256 B2 | 4/2014 | Alkjaer | |
| 8,710,757 B2 | 4/2014 | Welten | |
| 8,714,793 B2 | 5/2014 | Rice | |
| 8,716,936 B2 | 5/2014 | Rohner et al. | |
| 8,716,953 B2 | 5/2014 | Kreiner et al. | |
| 9,234,643 B2 | 1/2016 | Lagutko | |
| 2005/0001563 A1 | 1/2005 | Logan | |
| 2006/0139161 A1* | 6/2006 | Beghelli | G08B 25/009 |
| | | | 340/514 |
| 2007/0229250 A1* | 10/2007 | Recker | G08B 5/36 |
| | | | 340/531 |
| 2013/0304131 A1* | 11/2013 | McLean | A61B 17/7011 |
| | | | 606/279 |
| 2014/0145644 A1 | 5/2014 | Netzel, Sr. et al. | |
| 2014/0146540 A1 | 5/2014 | Wilcox et al. | |
| 2015/0296599 A1* | 10/2015 | Recker | H05B 37/0272 |
| | | | 315/153 |
| 2016/0211699 A1* | 7/2016 | Kwon | H02J 9/061 |

\* cited by examiner

EMERGENCY LIGHT DEVICES, SYSTEMS, AND METHODS

FIELD

This disclosure generally relates to an emergency light system with the ability of a light source to automatically turn on when there is a power outage or the main power source of electricity has ceased or is unavailable.

BACKGROUND

For decades there have been sources of light in emergency or power outage situations for office and commercial buildings. These emergency lights are usually located above exits and at the end of long corridors, providing adequate light to evacuate a building via specified emergency routes. However there are no emergency lights in residential homes. When the power goes out, a person must either find a flashlight and hope the batteries are good, or find a candle and a match if possible and then light the candle, both of which are difficult to do in the dark and under possible duress.

An alternative source of power in a blackout situation is a fuel powered generator, which not only provides electrical power to a house, but it also allows regular lights to be used. However, generators are not conveniently located, and when the power is lost, a person must locate and move the generator into a location that will allow the generator to connect with its designated socket or connection point, etc. A person must also check the fuel in the generator and start it, all in the pitch dark. These power sources are noisy, bulky in size, and expensive to own and operate. The average person does not have the physical space to store the generator or the financial wherewithal to afford the purchase of one. For the previously mentioned reasons, alternative and inexpensive light sources are needed in power outages or emergency blackout situations.

SUMMARY

An instant source of light for emergency blackouts or power outages by utilizing the emergency light device(s), system(s), and method(s) is described that senses when the main power source is shutoff, or when the power entering the main power box has ceased, then instantly activates the emergency light device(s) via wireless technology.

Because there are times when a source of instant light is needed, in another embodiment the emergency light device(s) can be activated in non-emergency situations.

In another embodiment, the emergency light device(s) can be activated, programmed, controlled, or used with a remote control device including but not limited to a portable or mobile device, a computer, tablet, or other devices currently invented or to be invented in the future.

In another embodiment, the emergency light device can use one or more light bulbs, which can be of any size or various sizes or a combination of sizes.

In another embodiment, the emergency light device can use light bulbs of the same strength in Watts, different Watt light bulbs, or a combination of light bulbs with different Watts, or other means of measuring the light bulb's output.

In another embodiment, the emergency light device can use an electronic integrated circuit such as a microchip(s) or a Nano chip(s) or other electronic integrated circuits invented or to be invented in the future.

In another embodiment, the emergency light device can use a microprocessor or a Nano processor, or other processor invented or to be invented in the future.

In another embodiment, the emergency light device can use a wireless transmitter. The emergency light device can use current wireless technology or wireless technology invented in the future.

In another embodiment, the emergency light device can include a wireless receiver. The emergency light device can use current wireless technology or wireless technology invented in the future.

In another embodiment, the emergency light device can include a wireless transmitter and can include a wireless receiver.

In another embodiment, the emergency light device can be powered by one or more non-rechargeable batteries, or one or more rechargeable batteries, or any combination of rechargeable batteries and non-rechargeable batteries, of which the number of, the size of, the type and voltage of may vary, or the emergency light device may use other batteries not yet invented.

In another embodiment, the emergency light device can have a small indicator light, or lights, that indicate(s) the battery strength. The battery indicators may vary in number, color, shape, size, location, and in function.

In another embodiment, the emergency light device can have the ability to turn on, or turn off, one or more the emergency light devices from a mobile phone, a mobile device, a remote control device including but not limited to a tablet, mobile phone, personal computer, or other device. A person can selectively turn on/off the emergency light devices on a room-by-room basis, each selected individual emergency light device, a combination of emergency light devices, or all emergency light devices. A person can do this from another location not in the vicinity of the emergency light device(s).

In another embodiment, the emergency light device can have a software application or software program that provides mobile devices, computers, tablets, and other devices that can use software, to monitor and utilize the emergency light device in any location. The embodiment allows a person to remotely control, monitor, make adjustments to, program, and utilize features and abilities of the emergency light device. The embodiment can be updated via wired or wireless connections. Further, the embodiment allows communication with the emergency light device via wired or wireless communication.

In another embodiment, the emergency light device can have a remote control device to turn on/off one or more emergency light devices using wired or wireless technology to communicate with the emergency light devices. There may be many different embodiments of the remote control device, ranging from a basic remote control device that can simply turn on/off all emergency light devices within a household or structure, as an example, to a more complex remote control device that offers many embodiments that can have the ability to selectively choose one specific emergency light device to turn on/off and/or the ability to turn on/off any of the emergency light devices within a household or structure, and/or turn on/off the emergency light devices on a room-by-room basis, as another example, and/or many other variations of embodiments. The previous examples of embodiments of the emergency light device's remote control are only examples of some embodiments and do not limit the emergency light device or its remote control device to the examples given.

In another embodiment, the emergency light device may include a reflector surface under and/or around the light bulb to enhance the illumination of the light radiating from the light bulb(s) of the emergency light device.

In another embodiment, the emergency light device can vary in size, shape, thereby allowing the emergency light device versatility in the location the emergency light device is placed. For example, a smaller emergency light device can attach to a table lamp or a floor lamp, or a larger emergency light device can be a stand-alone emergency light device resting on the floor. The shape, size, feature functions, other embodiments of the emergency light device may vary depending on its use and location. The examples described are examples of the emergency light device and its embodiments and do not limit the emergency light device to only the examples described.

In another embodiment, the emergency light device can have the ability to non-destructively removably attach to and/or be mounted onto anything, such as a table lamp, floor lamp, ceiling light, other lighting units, a wall unit, sconce, recessed lighting, or structures such as a wall, or any structure or surface. The examples given are intended to illustrate the attachability of the emergency light device and do not limit the emergency light device to only the examples given.

In another embodiment, the emergency light device can use any non-destructive, removable attachment mechanism, product, or device currently invented or to be invented in the future. As an example and in no way limiting the emergency light device to only the examples, the emergency light device can use an attachment mechanism such as a hook and loop fastener like VELCRO™, a clipping mechanism, adhesive, a belt-like apparatus, magnets or magnetic surface, O-ring, a cinch mechanism, and other known ways to attach one thing to another, as well as ways to attach one thing to another that are not yet invented. The previously mentioned examples and all methods of attachments may be used alone or in combination with one or more means of attachment. The examples are to illustrate and do not limit the emergency light device or its embodiments to the examples given.

In another embodiment, the emergency light device can have one or more light bulbs contained in, built in, or used with the emergency light device. There may be one, two, or more light bulbs used in the emergency light device, depending on the size, shape, intended use, intended location, number of embodiment of the emergency light device, or other variables.

In another embodiment, the location of the light bulbs used on or in the emergency light device may vary depending on the size, shape, intended use, the number of embodiments, the intended location of the emergency light device, or other variables that will determine the location of one or more of the light bulbs used in/on the emergency light device. The light bulb(s) may be located on one or more of the sides of the emergency light device. The light bulb(s) may be located on the top and/or the bottom of the emergency light device. The light bulb(s) may be located on all sides of the emergency light device, or in/on any location and/or in any number of light bulbs as may be designed, and/or in any shape of light bulb design on the emergency light device.

In another embodiment, the emergency light device can be any shape or size.

In another embodiment, the emergency light device can be an emergency light device power monitoring device that is placed on or near the incoming main power source, main power source panel, or other main power source embodiments for a building, home, apartment, cabin, boat, plane, or any structure with a power source. The emergency light device power monitoring device can monitor or sense when the power is on and when the power is suddenly off or no longer available by using sensors. The emergency light device power monitoring device can have an electrical power sensor(s), a micro/nano chip(s), a micro/nano processor(s), a wireless transmitter(s), a wireless receiver(s), a memory mechanism(s), and can be powered by rechargeable battery(s) and non-rechargeable battery(s). When the power is lost or no longer available, the emergency light device power monitoring device instantly senses the absence of power and instantly sends a wireless communication signal to one or more emergency light devices in the building, home, apartment, cabin, boat, plane, or any structure the emergency light device power monitoring device and emergency light device(s) are located, which instantly turns on the emergency light device(s) and the light bulb(s) of the emergency light device(s).

In another embodiment, the emergency light device can be an emergency light device main control device. The emergency light device main control device can be the main control device to receive a wireless communication signal from the emergency light device power monitoring device that the power is off and the emergency light device main control device will instantly send a wireless signal to the emergency light device(s) designated by the owner of the emergency light device(s) to turn on. The emergency light device main control device can be programmed using its embodiments. The emergency light device main control device can be programmed remotely by using the emergency light device remote control device, or by using a computer, mobile device, tablet, and other technology devices. The emergency light device main control device can turn on one or more specific emergency light devices turn on all emergency light devices, turn on emergency light devices in designated areas or rooms, or any combination desired. The emergency light device main control device can have a micro/nano chip(s), a micro/nano processor(s), a wireless transmitter(s), a wireless receiver(s), a memory mechanism(s), and can be powered by rechargeable battery(s) and non-rechargeable battery(s), A/C or D/C power, or any combination therein.

In another embodiment, the emergency light device can use solar energy and other forms of power invented or to be invented in the future.

In another embodiment, the emergency light device can be powered by A/C power until the A/C power source is stopped, then the emergency light device instantly uses its battery power to perform all functions described herein. When the A/C power source has been reestablished and power is restored, the emergency light device will be powered by A/C power, and if the emergency light device is equipped with rechargeable batteries, the emergency light device will begin to recharge the batteries to full strength.

In another embodiment, the emergency light device can be made of a substance or material that is heat and/or fire resistant, thereby allowing the emergency light device to be placed and/or located in close proximity to an incandescent light bulb or other light bulb that may be used in table lamps, floor lamps, recessed lighting, and other products, objects, embodiments with heat producing embodiments, without the emergency light device being harmed, melting, igniting or other detrimental process.

In another embodiment, the emergency light device can be used in recessed lighting fixtures, such as recessed ceiling lights, to provide lighting when there is no electrical power. The example of recessed ceiling lights is an illustration of one emergency light device as in no way limits the emergency light device to this example or other examples herein.

In another embodiment, the emergency light device can be a stand-alone light device. The emergency light device can be placed in any location a person desires to have a source of light in power outage or blackout situations, or the emergency light device may be used in non-blackout or loss of power situations.

In another embodiment, the emergency light device can be a portable emergency light device.

In another embodiment, the emergency light device can be a wall switch device that senses the electricity current or flow of electricity to the wall switch device. When the electricity flows to the wall switch, the emergency light device wall switch device can sense and monitor the electricity whether the wall switch is flipped/turned on or off, and when there is no electricity flowing to the emergency light device wall switch device, the emergency light device wall switch device instantly communicates to the emergency light device(s) to turn on, thereby illuminating its light bulb(s). The emergency light device wall switch device can have a micro/nano chip(s), a micro/nano processor(s), a wireless transmitter(s), a wireless receiver(s), a memory mechanism(s), and can be powered by rechargeable battery(s) and non-rechargeable battery(s). The emergency light device wall switch device can vary in size, shape, and in number of and types of embodiments.

In another embodiment, the emergency light device can monitor the strength of the battery or batteries, or other power source used to power the emergency light device and indicate the battery or power strength by using indicator lights to indicate the power of the battery(s) or power source of the emergency light device. There can be indicator lights on all emergency light device-related devices, including the remote control device, the emergency light device power monitoring device, the emergency light device main control device, and other devices described, to be described, or implied.

In another embodiment, the emergency light device and all its related devices and embodiments can be programmable. The programmability can be done directly on/in the emergency light device and its related devices, or it can be done remotely using the emergency light device remote control device, a mobile device, tablet, computer or other device, and the features, functions, and embodiments to be programmed can vary.

In another embodiment, the emergency light device may be used in/on all boats, recreational vehicles, automobiles, all motorized and non-motorized vehicles, or any location the user desires, and is not limited to residential or commercial properties. The emergency light device is not limited examples given or described herein and may be used in any location where light is desired.

DRAWINGS

To enable a further understanding of the different aspects and the technological methods of the emergency light device herein, the brief description of the drawings below is followed by the detailed description of the preferred embodiments.

Figure 10:
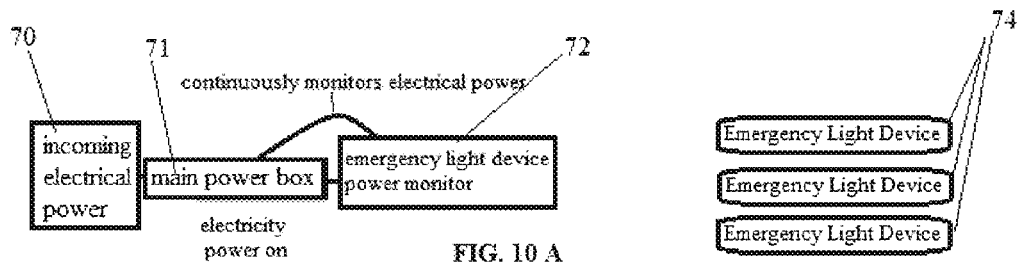
Figure 10:
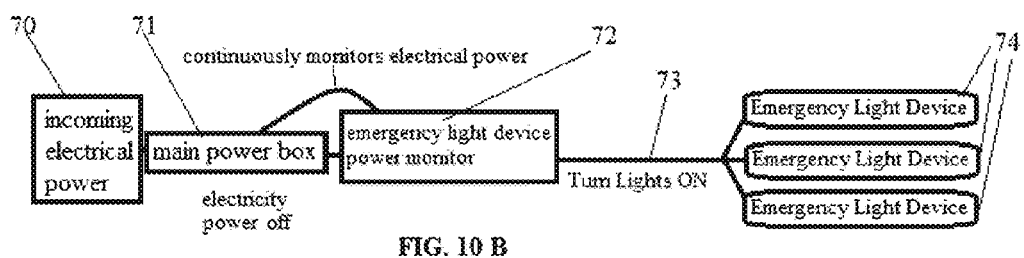
Figure 10:
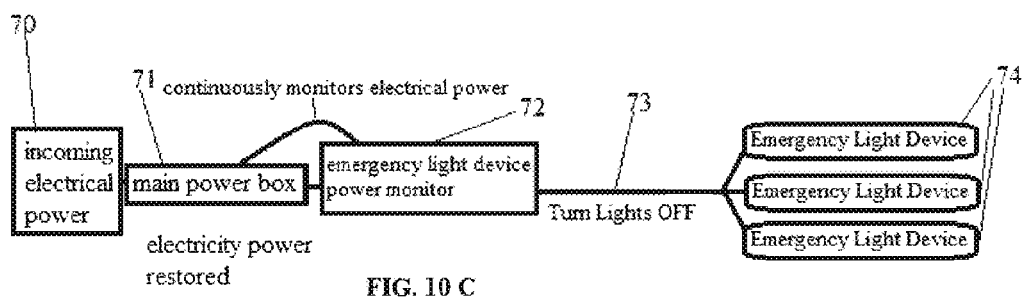

FIGS. 10A, 10B, and 10C illustrate examples of systems that can utilize the emergency light devices described herein.

Figure 11:
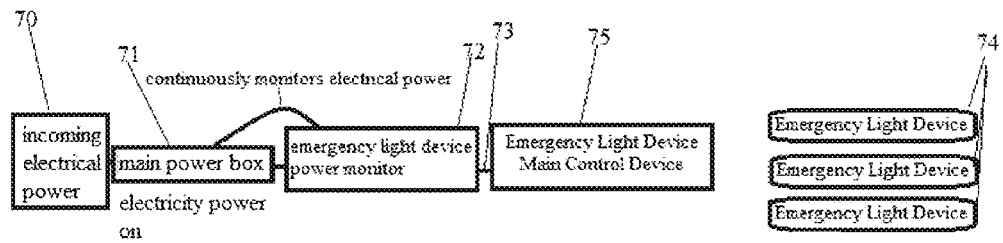
Figure 11:
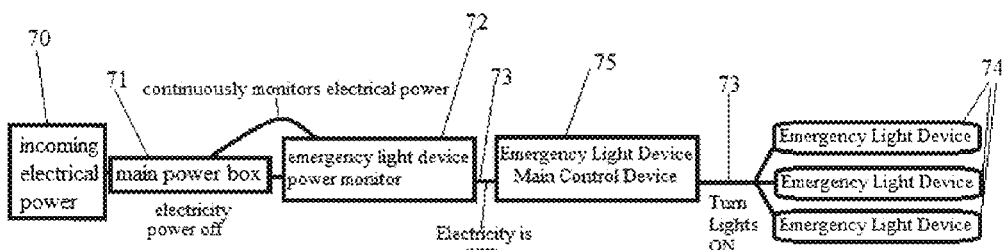
Figure 11:
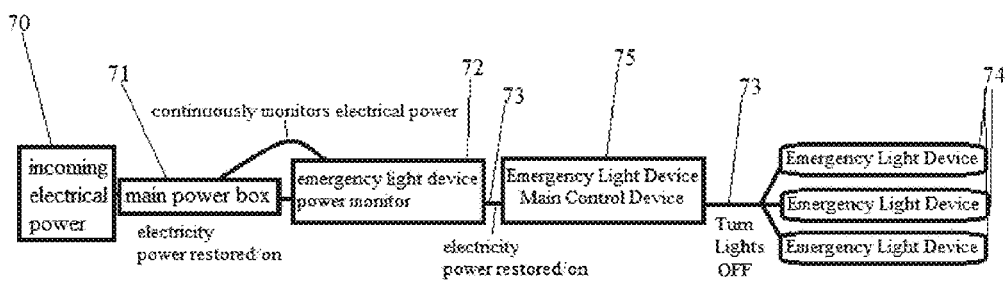

FIGS. 11A, 11B, and 11C illustrate examples of systems that can utilize the emergency light device described herein.

Figure 12:
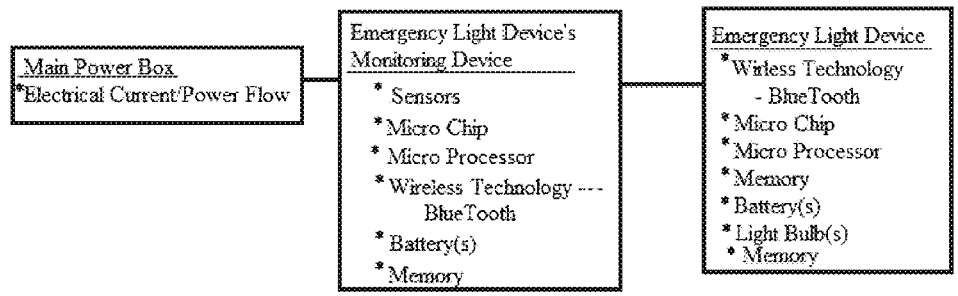
Figure 12:
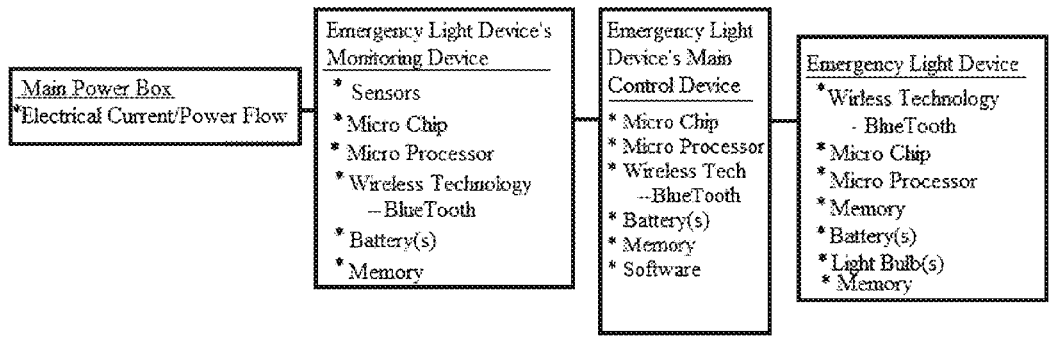

FIGS. 12A and 12B illustrate examples of systems that can utilize the emergency light device described herein.

Figure 13:
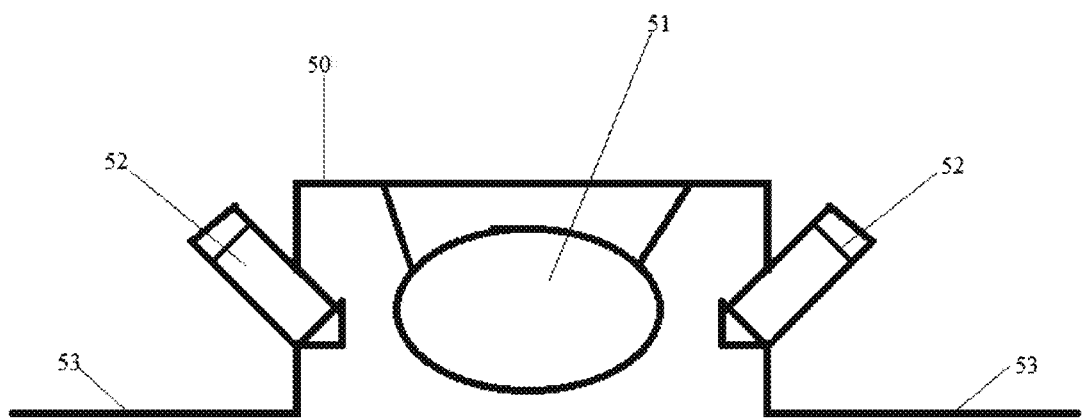

FIG. 13 shows a cutout side view of an embodiment of the emergency light device used in a recessed ceiling light.

Figure 14:
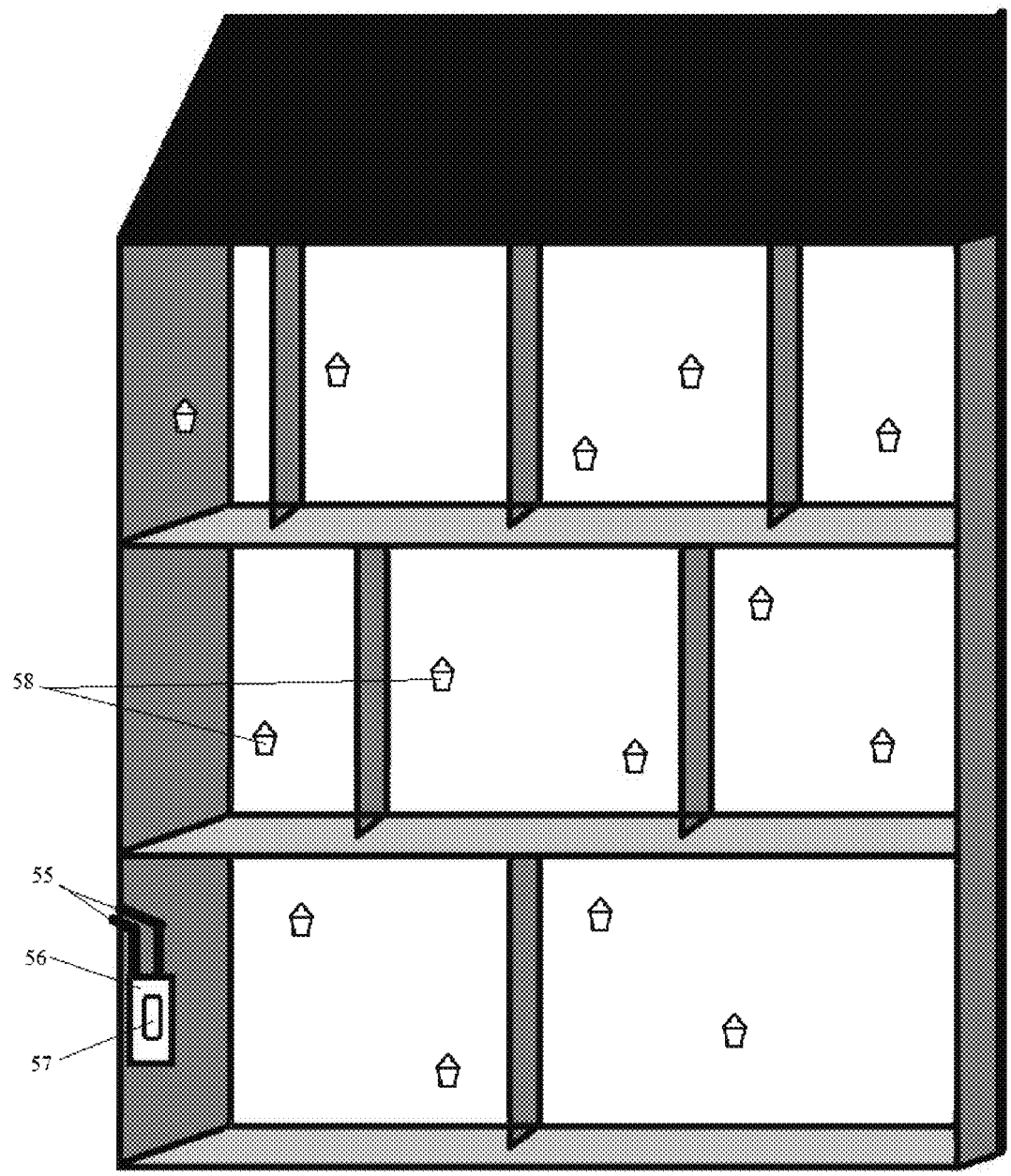
Figure 14:
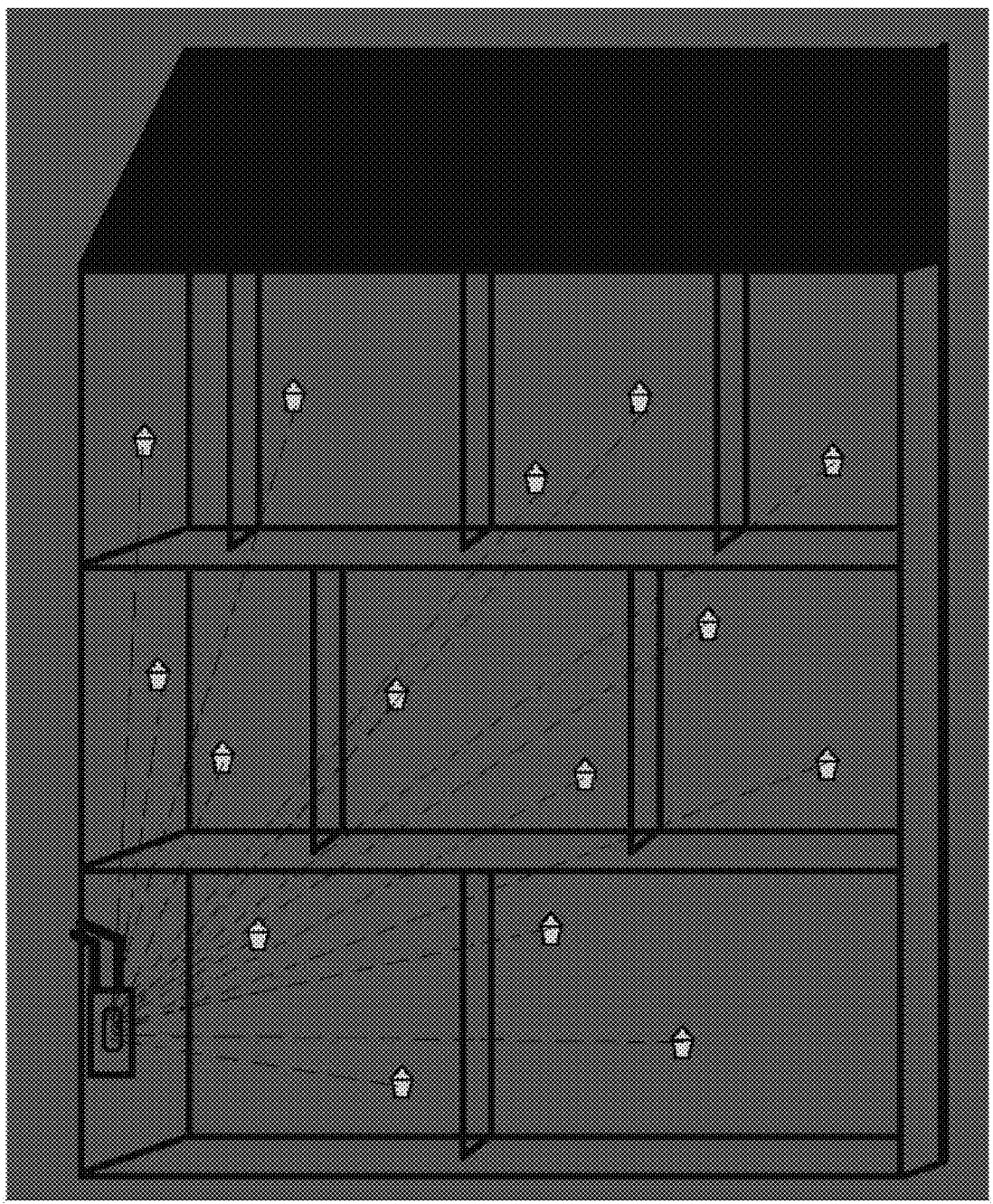
Figure 14:
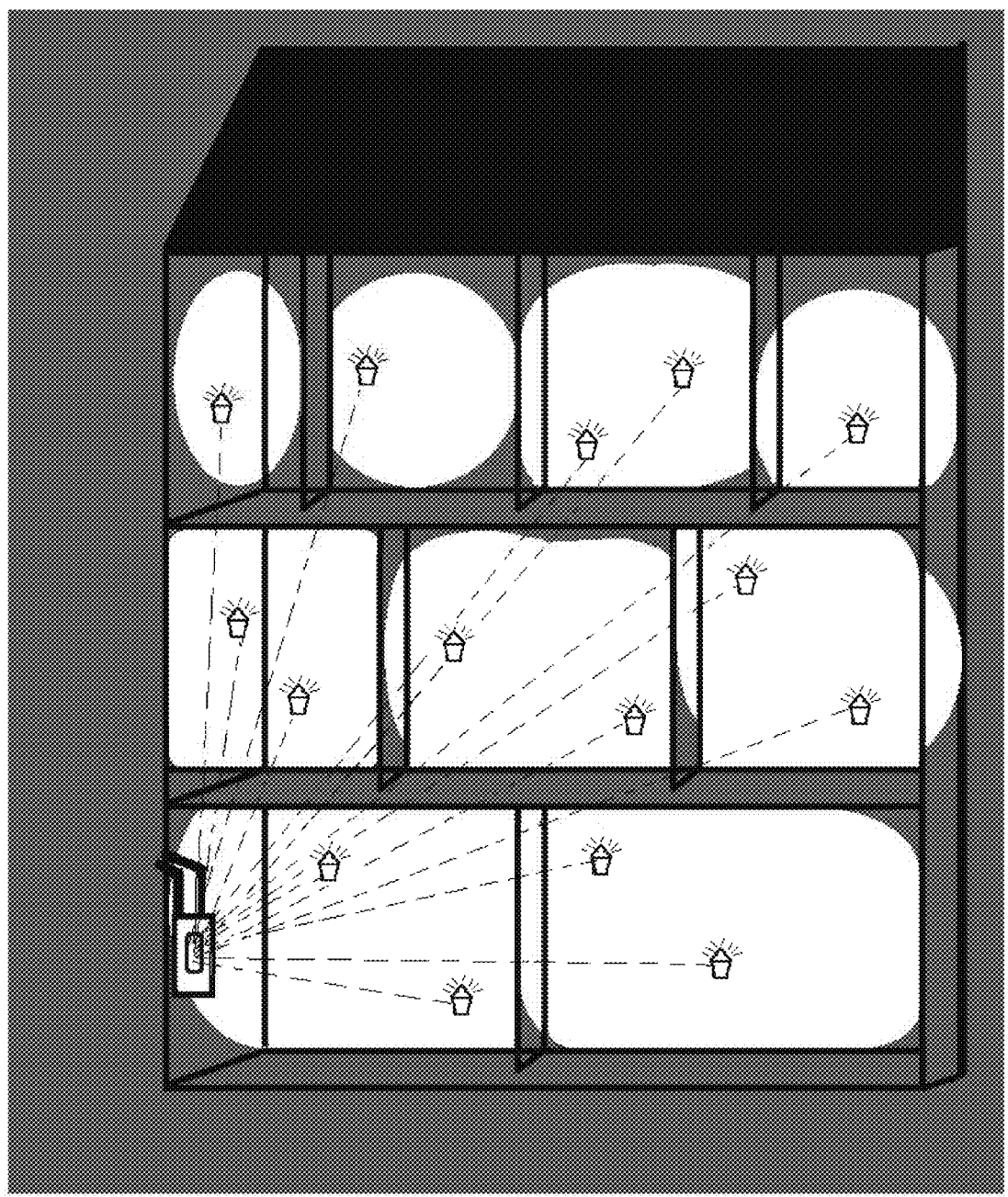

FIG. 14A is a side view of a house showing an example application of the emergency light system used in the house.

FIGS. 14B and 14C are similar to FIG. 14A but illustrating operation during a power outage, with the emergency light device power monitoring device sending wireless communication to each emergency light device, and the emergency light devices turning their light bulbs on.

Figure 15:
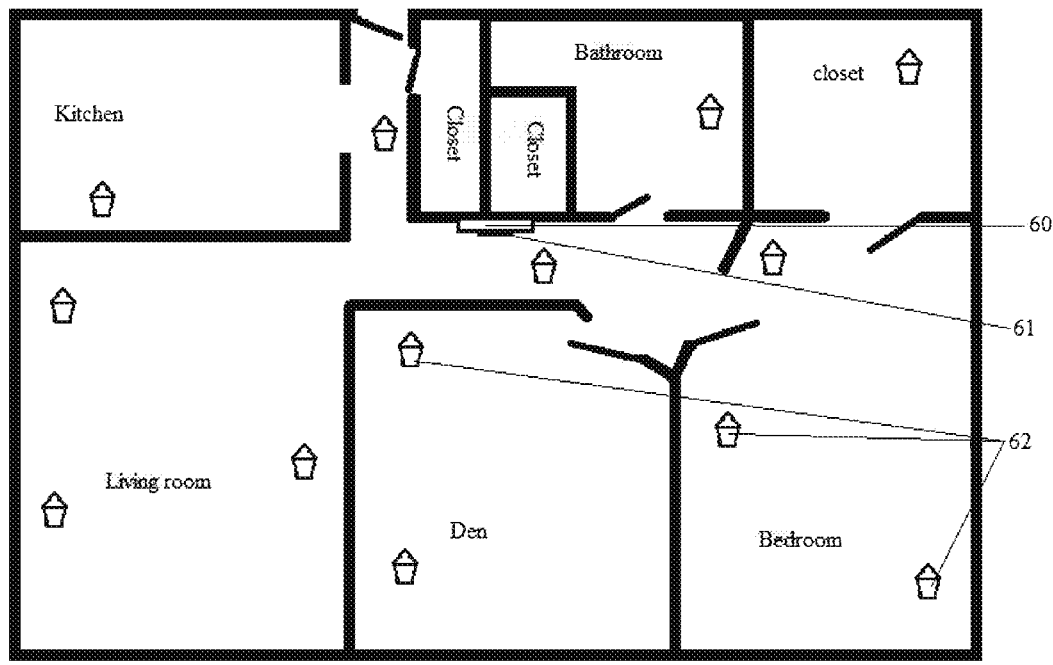
Figure 15:
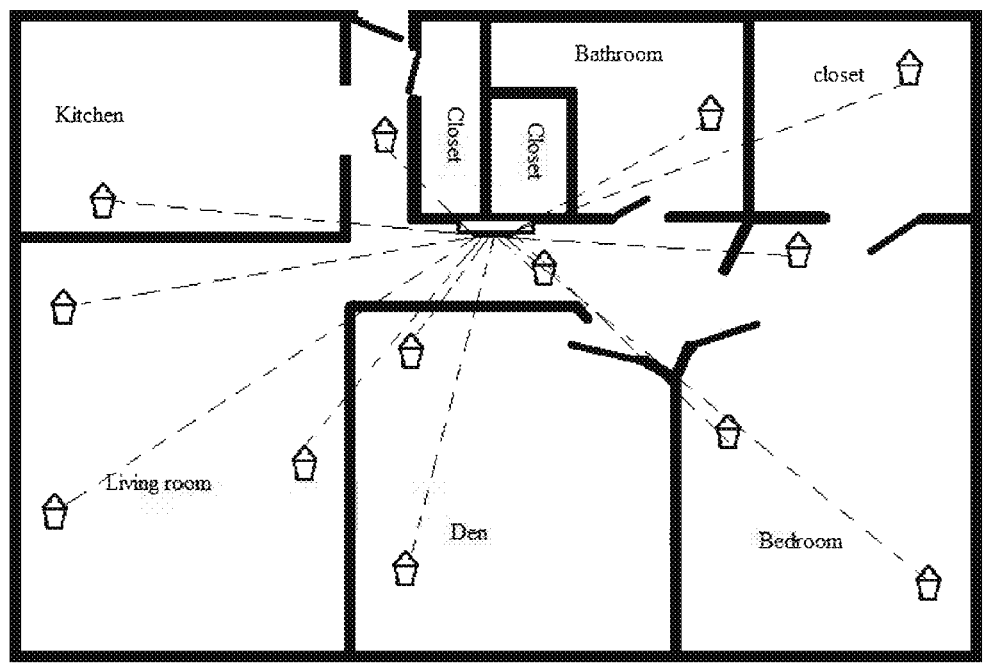
Figure 15:
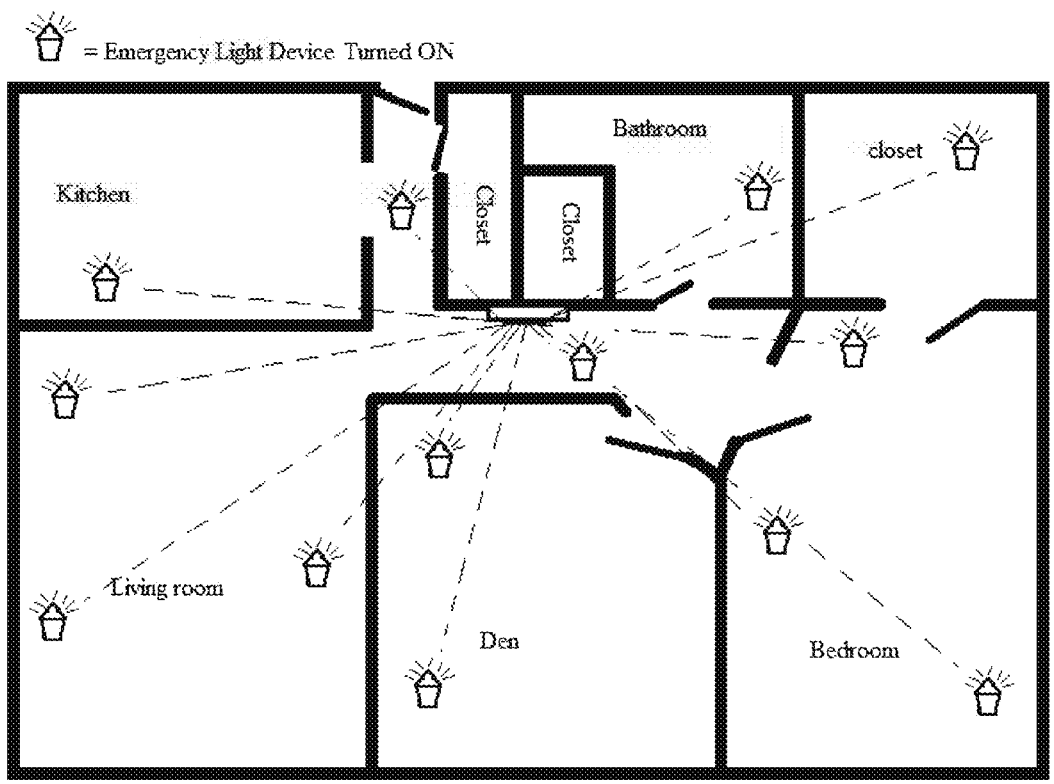

FIGS. 15A, 15B and 15C are top views of an apartment or single level dwelling showing an example application of the emergency light system.

Figure 16:
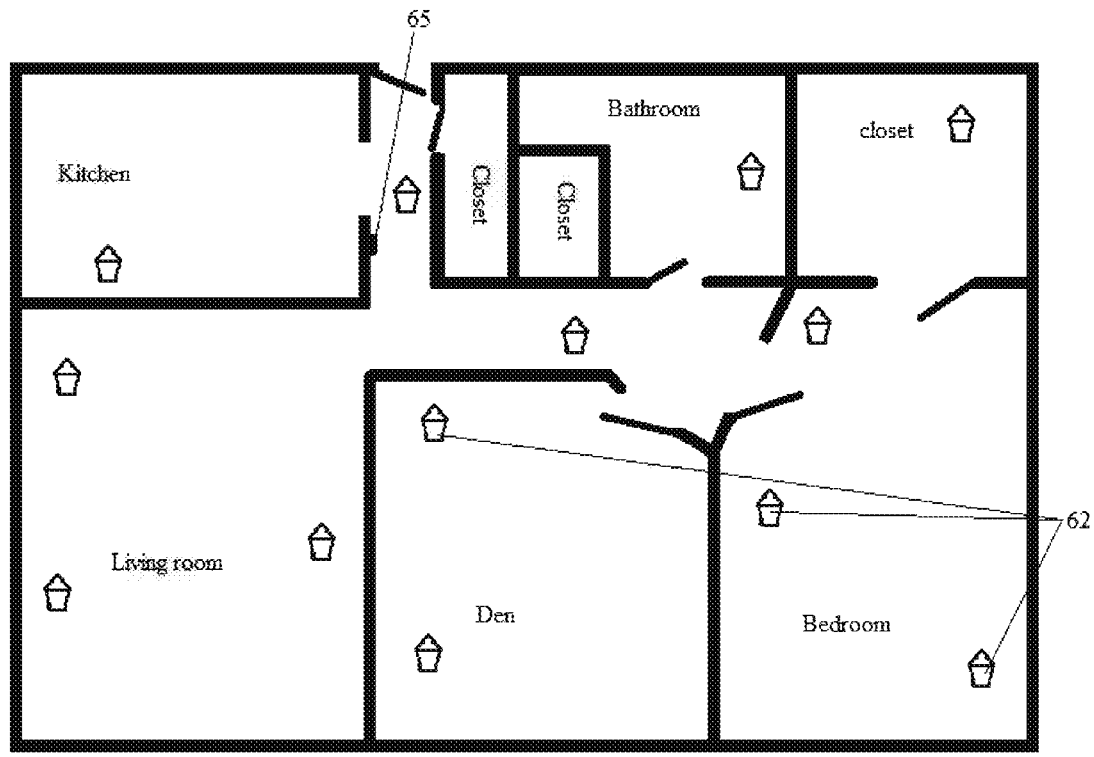
Figure 16:
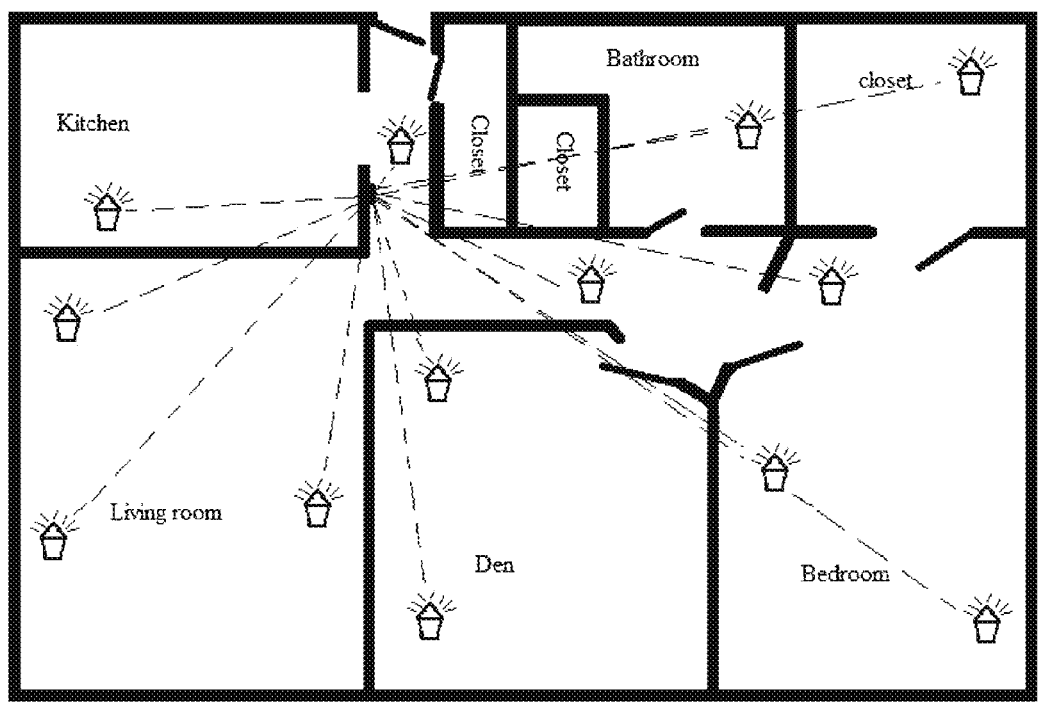

FIGS. 16A and 16B are views similar to FIGS. 15A-C but utilizing a wall switch power monitoring device wirelessly communicating with the emergency light devices and the emergency light devices turning their light bulbs on.

DETAILED DESCRIPTION

Selected embodiments of the emergency light device will now be explained with reference to the drawings. It will be apparent to those skilled in the art from this disclosure that the following descriptions of the embodiments of the emergency light device are provided for illustration purpose only and not for the purpose of limiting the emergency light device to the illustrations and as defined by the appended claims and their equivalents.

Figure 1A:
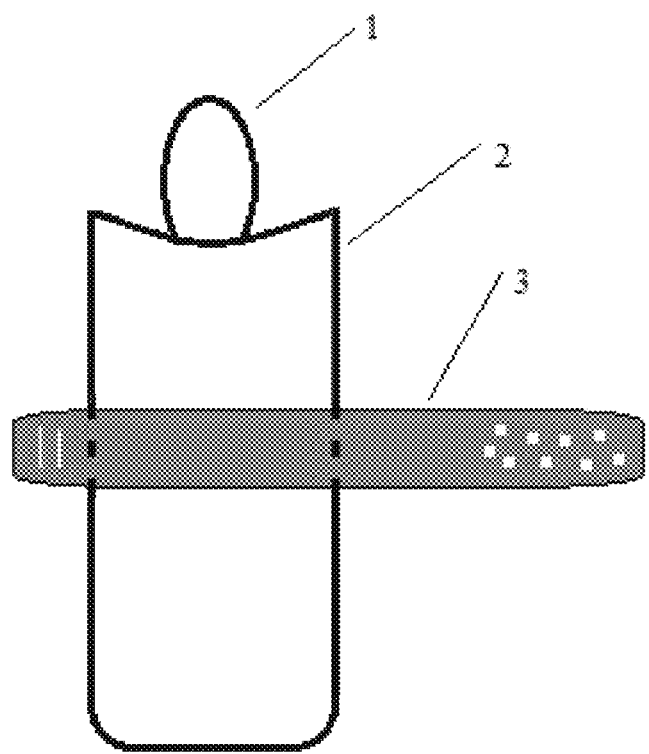
FIGS. 1A and 1B show side views of different embodiments of an emergency light device with examples of attachment mechanisms.
Figure 1B:
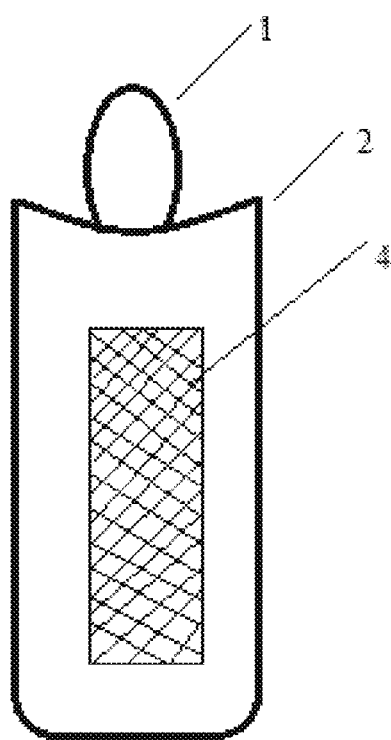

Referring to FIGS. 1A and 1B, two examples of an emergency light device 2 are illustrated with different attachment mechanisms that can be used to non-destructively, removably attach the emergency light device 2 to an object. FIG. 1A illustrates an example of a strap attachment mechanism 3, and a light bulb 1. The strap attachment mechanism 3 is wrapped around an object and cinched together to secure the emergency light device 2 to the object. Illustrated in FIG. 1B is an attachment mechanism 4, such as a hook and loop fastener such as VELCRO™, as an example of one method of attaching the emergency light device 2 to another surface, object, or wherever a person would like to attach it. FIGS. 1A and 1B illustrate a single light bulb 1 version of the emergency light device, however there may be more than one light bulb used in other versions or models of the emergency light device, and this example is for illustration only and in no way limits the emergency light device to one light bulb. FIGS. 1A and 1B are examples of two attachment methods/mechanisms for the emergency light device and in no way limit the emergency light device to the examples only, as there are many attachment methods/mechanism available to use with the emergency light device.

Figures 1C, 1D:
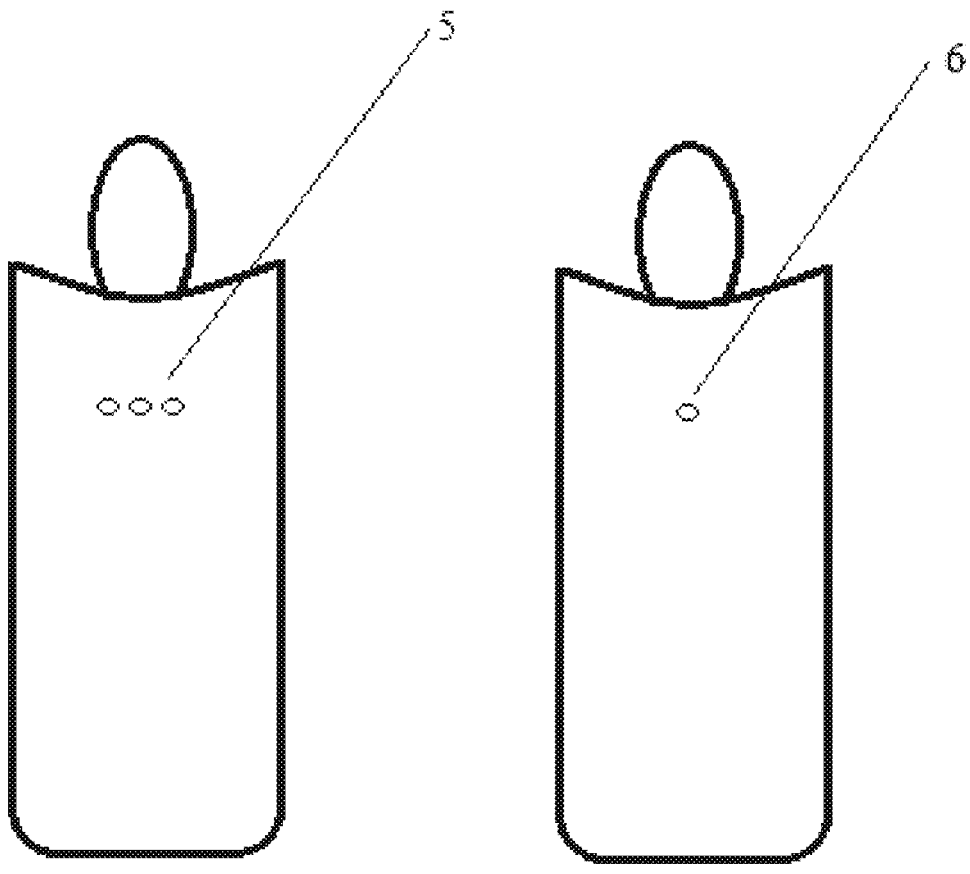
FIGS. 1C and 1D show side views of different embodiments of the emergency light device with examples of battery strength indicator lights.

Shown in FIGS. 1C and 1D are side views of further embodiments of the emergency light device. Illustrated in FIGS. 1C and 1D are battery strength indicator lights 5 and 6, respectively. FIG. 1C shows three battery strength indicator lights 5, which may be represented by the colors green, yellow, and red, to indicate the strength of the battery, batteries, or another power source of the emergency light device. FIG. 1D shows one battery or power strength indicator light 6, which can indicate the strength of the battery, batteries, or other power source by illuminating in different indicator colors, such as green when strength is good, yellow when the battery, batteries or other power source is adequate but needs charging or replacement, or red to indicate the battery, batteries or other power source is dead or out of charge and the immediate replacement of the battery, batteries or other power source is needed, or immediate charging is required if a rechargeable battery(s) is used. These power strength indicator lights are a method to inform the owner of the device(s) of the battery power. The number of and location of the power/battery strength indicator lights may vary in/on the emergency light device and the illustrated examples of the location of and the number of indicator lights may vary, as well as the shape and size of the indicator lights, and the illustrations in FIGS. 1C and 1D in no way limit the emergency light device to the illustrated examples described or to be described later herein.

Figure 2:
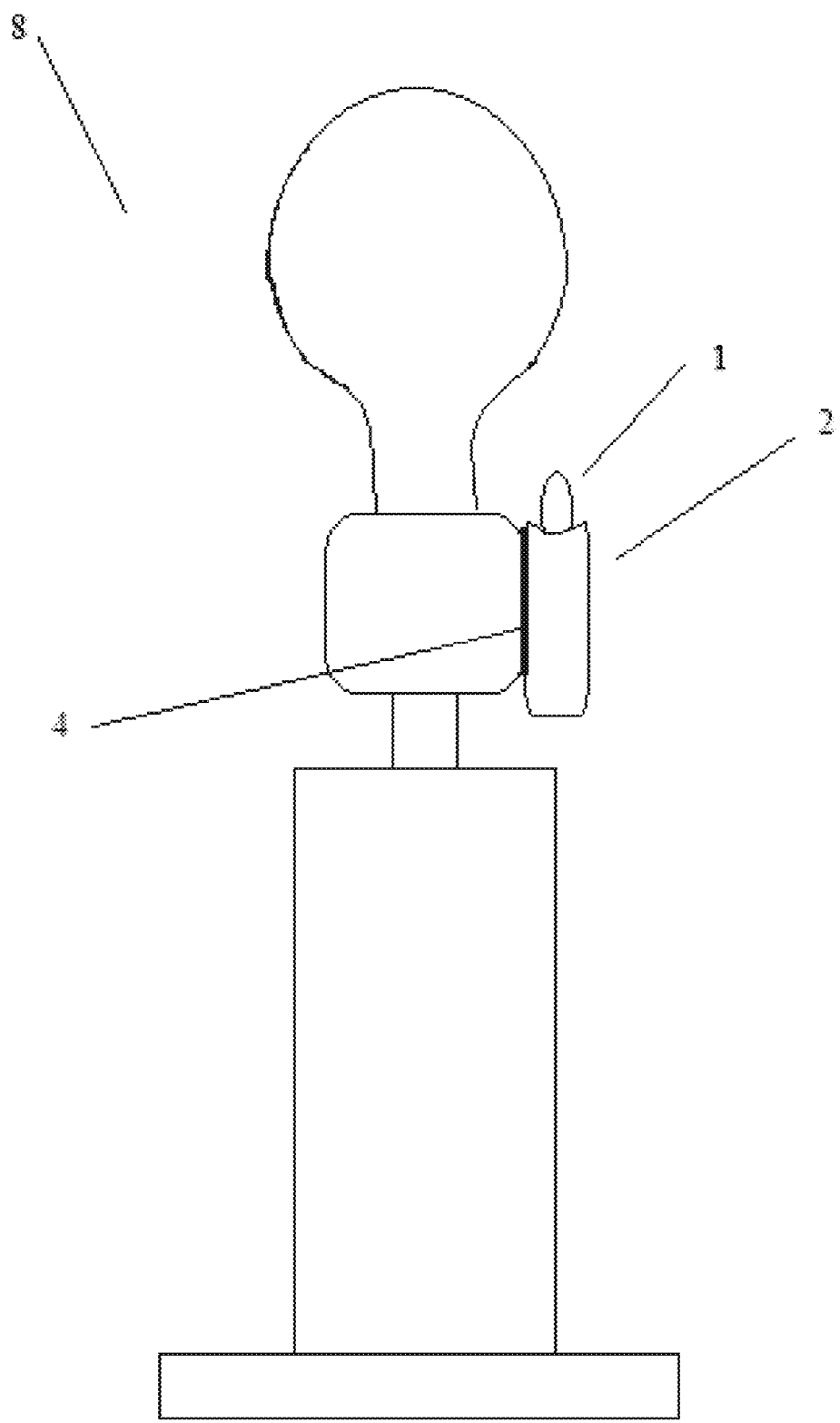
FIGS. 2A and 2B show side views of different embodiments of the emergency light device attached to a table lamp.
Figure 2:
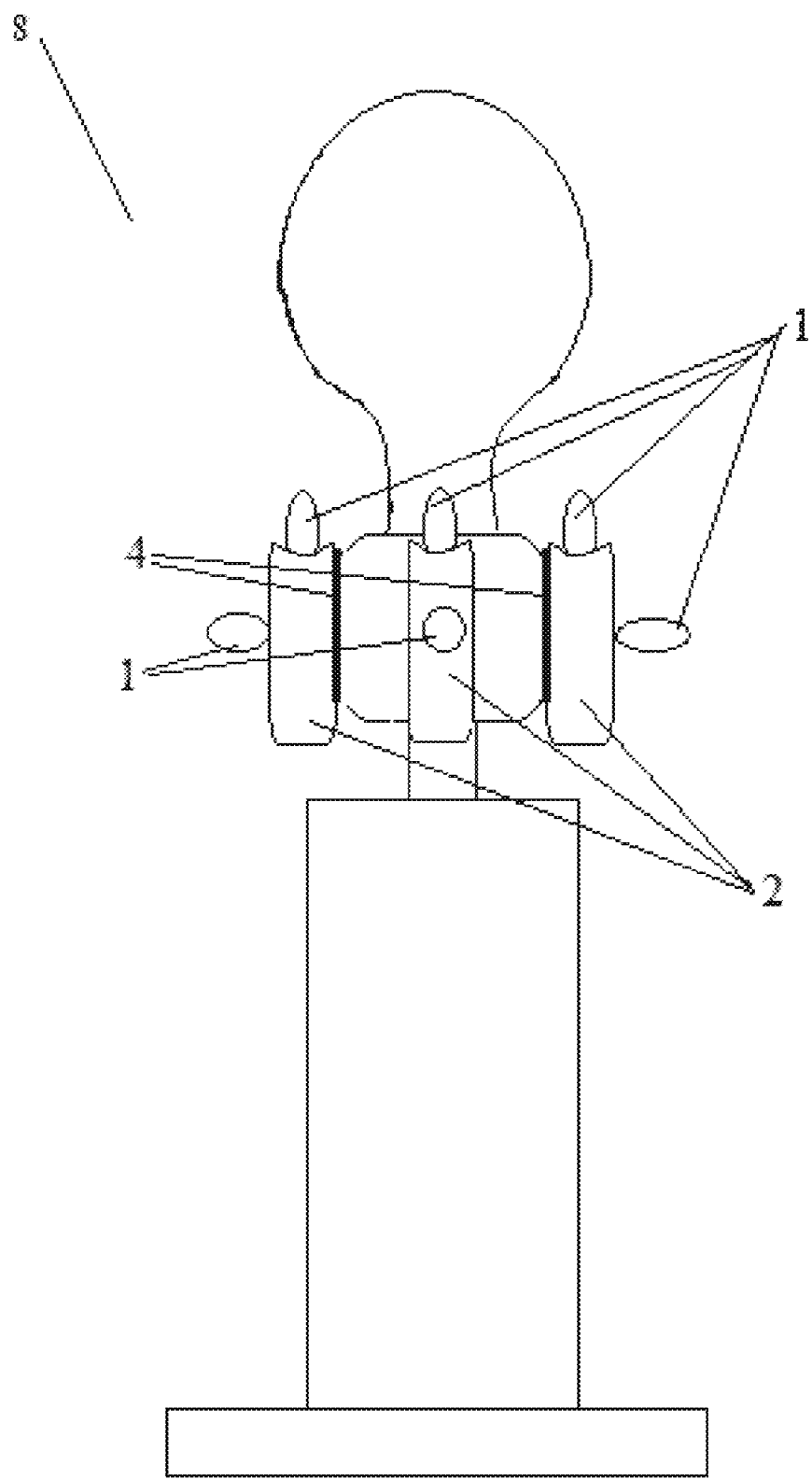

Shown in FIG. 2A is a side view of the emergency light device 2 attached to a table lamp 8. Illustrated in FIG. 2A is the emergency light device 2 utilizing a hook and loop attachment mechanism 4, like VELCRO™, to attach to the table lamp 8. The emergency light device 2 has one light bulb 1, including but not limited to a light emitting diode (LED) bulb, on the top of the emergency light device 2, which will activate and the light bulb 1 will illuminate when the emergency light device 2 receives a wireless signal that the power is off. The emergency light device 2 can be attached to any part of the table lamp 8, and the location illustrated in FIG. 2A is an example of one possible location. FIG. 2A is an illustration of one example of the emergency light device and in no way limits the emergency light device to the example given.

Shown in FIG. 2B is a side view of the emergency light device 2 embodied with four light devices, one attached on each side of the table lamp 8. In addition, FIG. 2B shows each emergency light device 2 as including two light bulbs 1.

Figure 3:
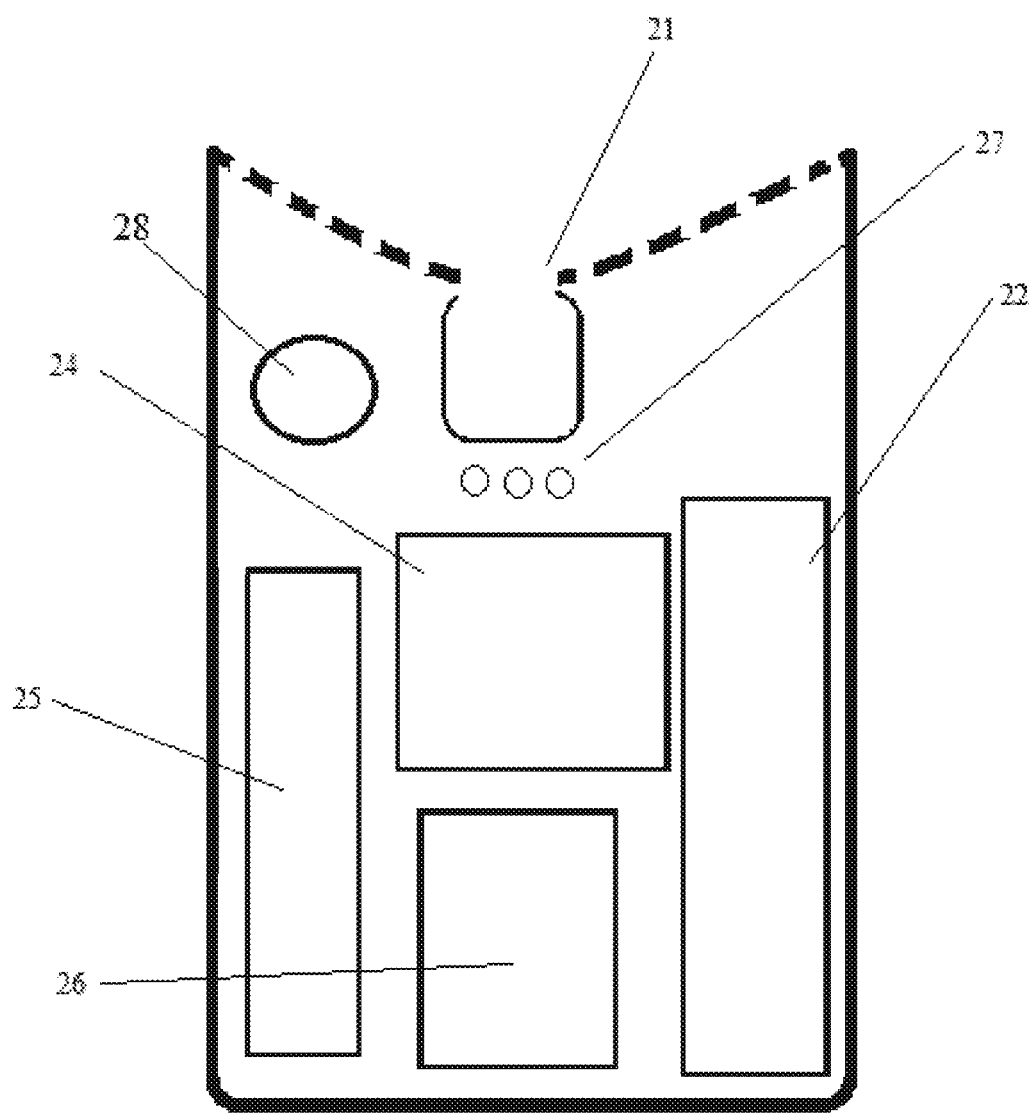
FIG. 3 shows a cut-out side view of an embodiment of the emergency light device, revealing examples of internal components in one embodiment.

Referring to FIG. 3, the emergency light device can include a light bulb socket 21, which may vary in numbers and locations in/on the emergency light device, therefore the emergency light device can contain and utilize one or more light bulbs. Further illustrated in FIG. 3 is at least one rechargeable battery 22 to provide power to the emergency light device. Also illustrated in FIG. 3 is a microprocessor 24, or a Nano processor 24, either of which may be used or a combination may be used, depending upon the size of the emergency light device, which can be made in various sizes and shapes. Further illustrated in FIG. 3 is a microchip 25, or a Nano chip 25, either may be used or a combination may be used, depending upon the size of the emergency light device. A wireless communication mechanism/unit 26 is illustrated in FIG. 3 and is used by the emergency light device to wirelessly communicate with an emergency light device power monitoring device, an emergency light device main control unit, an emergency light device remote control device, and/or other devices such as a computer, mobile device, tablet, and other such devices, to receive one or more signals to turn the emergency light device light(s) on/off. The wireless communication mechanism/unit 26 may utilize Blue Tooth technology or any other technology that may be used to communicate wirelessly, invented or to be invented in the future. The size, shape, and number of the wireless communication mechanism/unit 26 can vary. Further illustrated in FIG. 3 are the battery or power strength indicator lights 27, which can illuminate in different colors, such as green, yellow, or red, dependent upon whether the battery strength or power is good, adequate, or dead, respectively. The size, shape, number of, and location of the battery or power strength indicator lights 27 can vary. Further illustrated in FIG. 3 is the memory mechanism 28 that can be used to store information, programmed and non-programmed information, and can be recalled and used at any time. The number of memory mechanisms 28 and the capacity of the memory mechanism 28 can vary, and may be interchangeable, and may vary in shape, size, capacity level, and in numbers. The emergency light device can use microprocessor(s), Nano processor(s), microchip(s), Nano chip(s), rechargeable battery(s), and wireless communication(s), all of which are common knowledge to those familiar with the aforementioned. The illustrated examples in FIG. 3 are for illustrative purpose of the emergency light device only and are not intended to limit the emergency light device to the examples described and illustrated.

Figure 4:
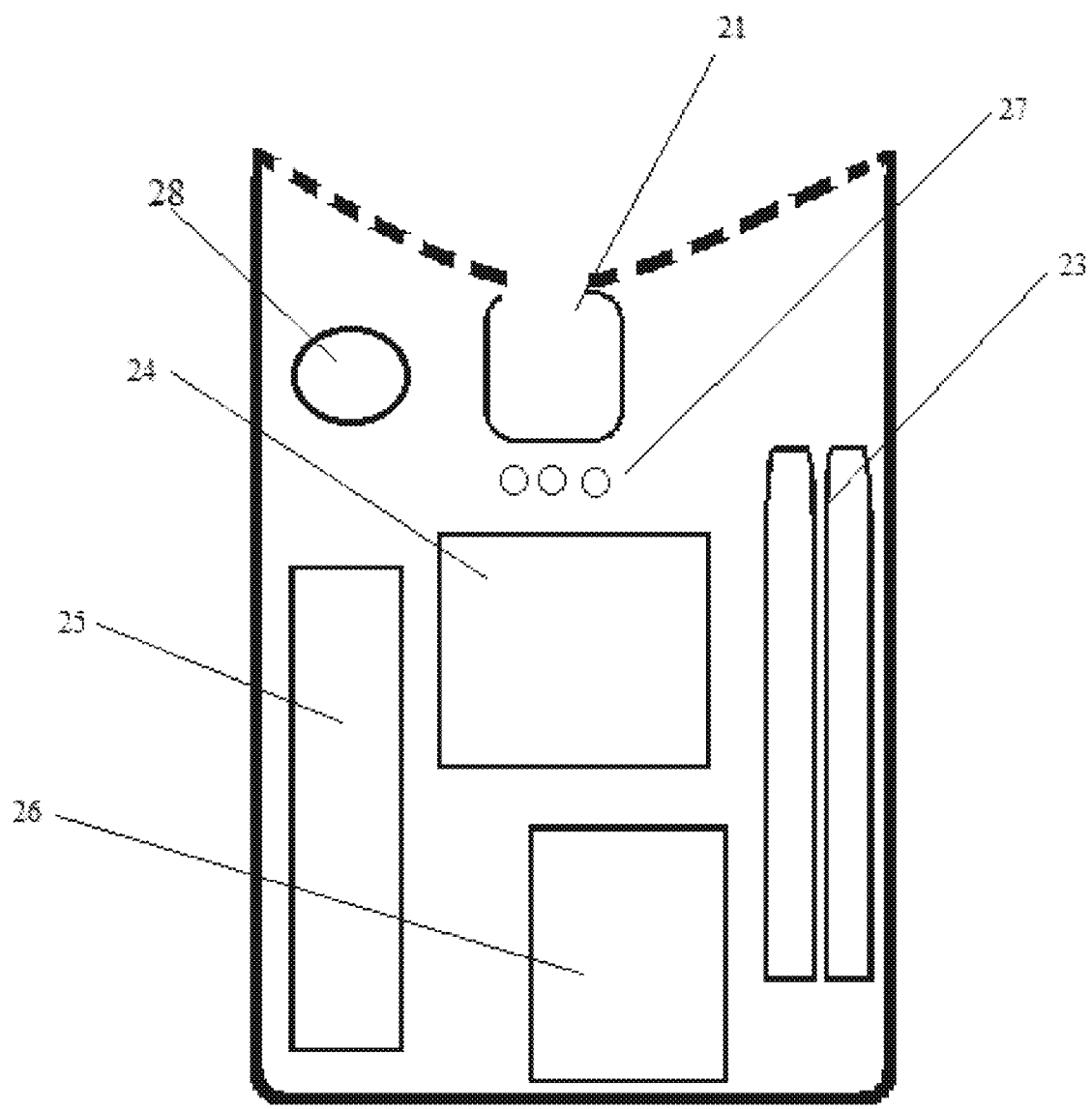
FIG. 4 shows a cut-out side view of an embodiment of the emergency light device, revealing examples of internal components in another embodiment.

FIG. 4 shows an embodiment of an emergency light device that is similar to FIG. 3. However, the embodiment illustrated in FIG. 4 uses two or more rechargeable or non-rechargeable batteries 23 to provide power to the emergency light device. The two batteries 23 illustrated are examples of a possible location within the emergency light device and the example of two batteries is for illustration only and in no way limits the emergency light device to the examples and illustrations given.

Figure 5:
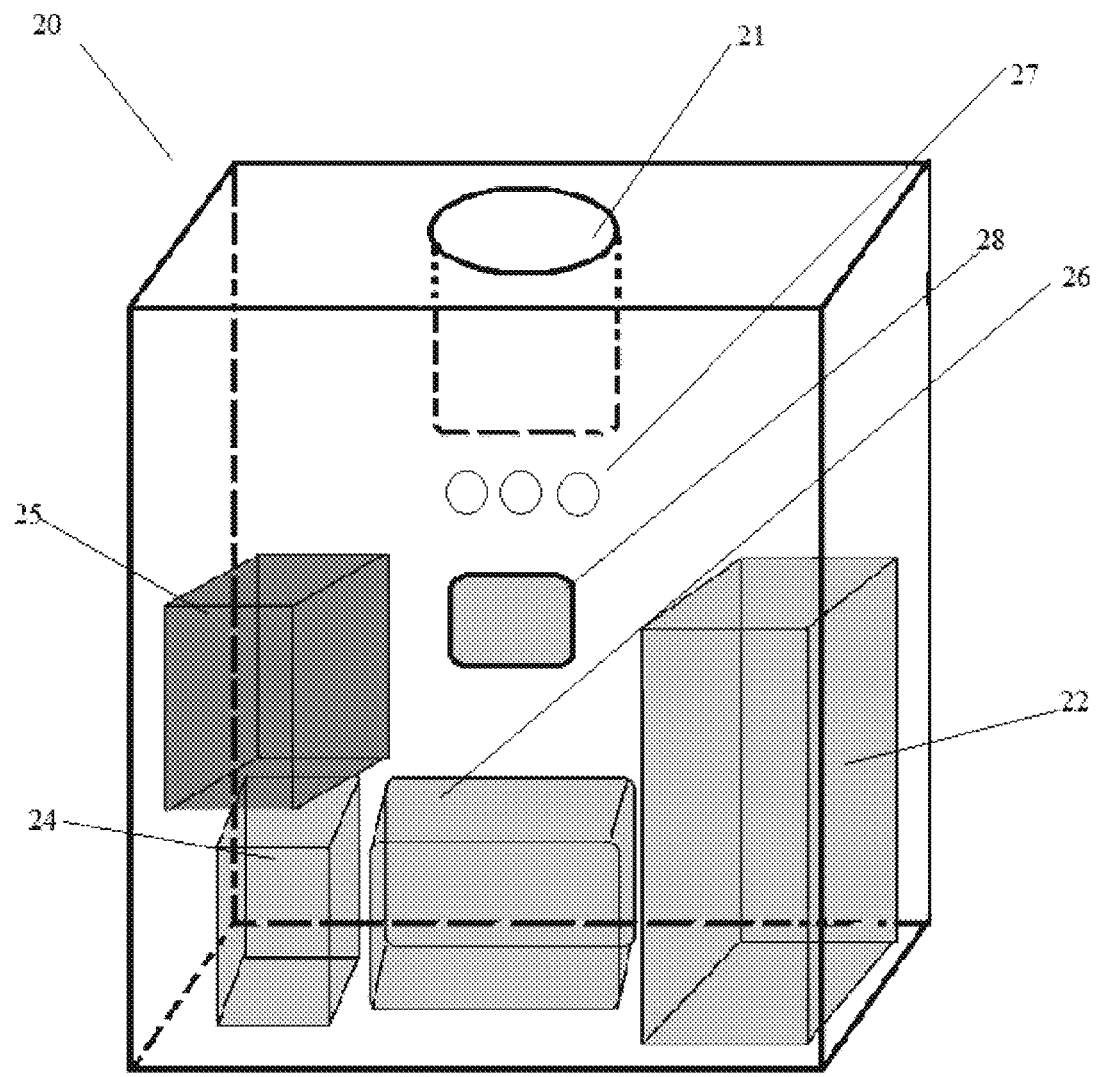
FIG. 5 shows a perspective side view of an embodiment of the emergency light device as a stand-alone device, with portions shown transparent revealing examples of internal components in one embodiment.

FIG. 5 illustrates the emergency light device as a stand-alone embodiment 20, revealing an example of a possible configuration of its internal embodiments and/or components. Illustrated in FIG. 5 is the rechargeable battery 22 as an example of one of many power sources available for use in the emergency light device stand-alone embodiment 20. The rechargeable battery 22 is an example of one power source for the emergency light device stand-alone embodiment 20 and in no way restricts or limits the emergency light device stand-alone embodiment 20 to the example described, further, the emergency light device stand-alone embodiment 20 can use one or more rechargeable or non-rechargeable batteries, another power source, or any combination thereof to power itself. Also Illustrated in FIG. 5 are the battery strength or power indicator lights 27, the wireless communication mechanism/unit 26, the microprocessor 24 or Nano processor 24, the microchip 25 or Nano chip 25, the light bulb socket 21, and the memory mechanism 28, all previously described. The configuration of the embodiments of the emergency light device stand-alone embodiment 20 can vary in size, shape, location, and in numbers within and on the emergency light device stand-alone embodiment 20, as well as the number of light bulb sockets 21. The shape and size of the emergency light device stand-alone embodiment 20 can vary and is not limited to the illustration in FIG. 5

Figure 6:
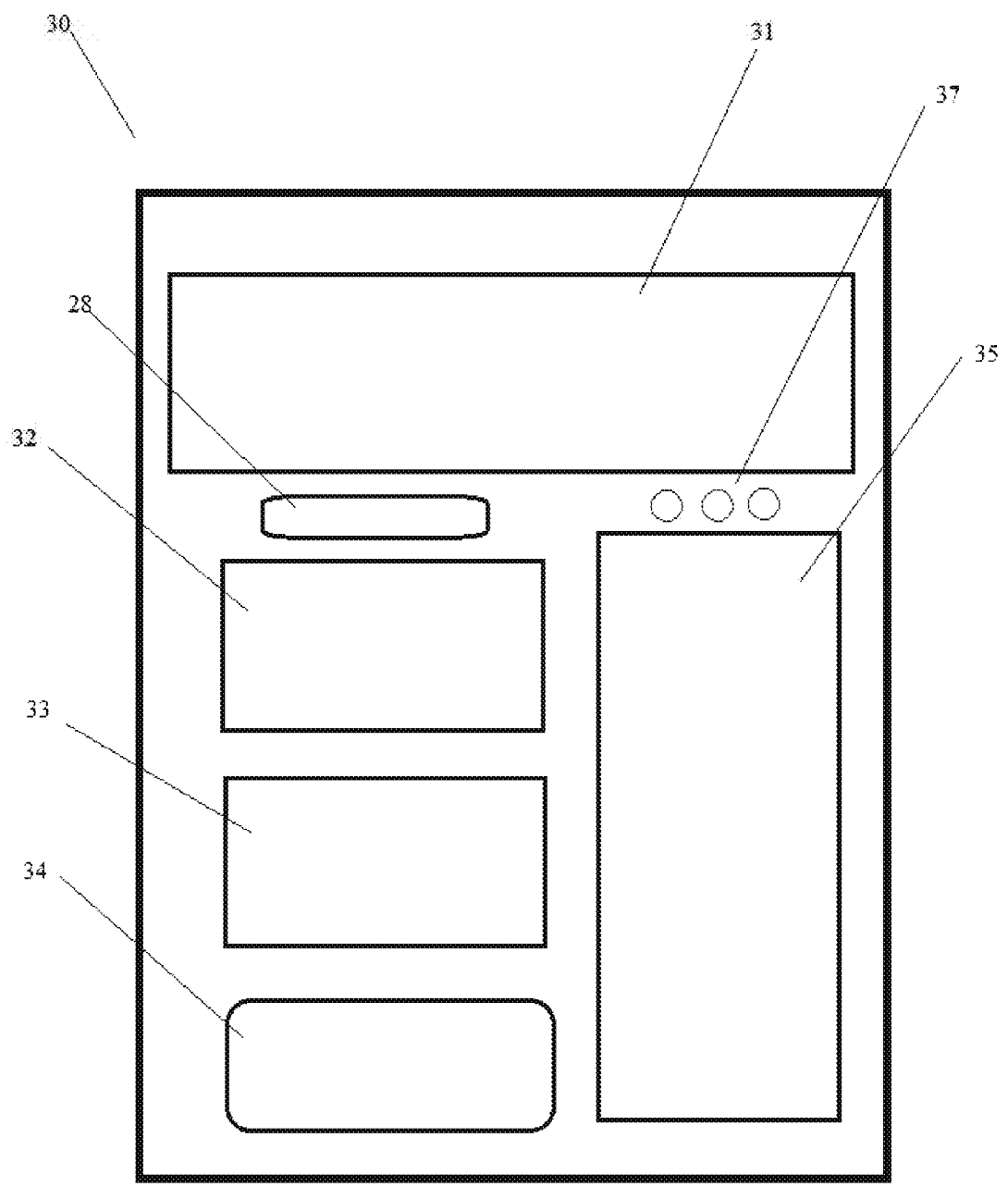
FIG. 6 shows a cut-out side view of an embodiment of the emergency light device's power monitoring device.

Shown in FIG. 6 is a cut-out side view of an emergency light device power monitoring device 30 that monitors and senses the flow of electrical power, usually from a power company, into a residential home, an apartment, an apartment building, a commercial building, vacation home, boat, recreational vehicle, plane, or any structure or dwelling that utilizes a power source. The emergency light device power monitoring device 30 can vary in shapes and sizes and is not limited to the illustration in FIG. 6. Illustrated in FIG. 6 are examples of internal embodiments/components of the emergency light device power monitoring device 30, which can vary in shape, size, in numbers of, and in the location within the emergency light device power monitoring device 30, and are not limited to the illustration in FIG. 6. Further illustrated in FIG. 6 are the internal embodiments of the emergency light device power monitoring device 30: a power monitoring sensor(s)/monitor(s) 31 that monitors/senses the flow of electrical current, or power, into the main power box of the building, or structure. The emergency light device power monitoring device 30 is placed on or near the main incoming power box of the building, apartment, or structure, and can be attached in many ways. When the emergency light device power monitoring device 30 is placed on or near the main incoming power box, and is turned on, the power monitoring sensor(s)/monitor(s) 31 senses the flow of electrical current/power into the main incoming power box, but when there is no electrical power flowing into the main incoming power box, the power monitoring sensor(s)/monitor(s) 31 sense that the power is off and instantly communicates via a wireless communication mechanism 34 to the emergency light device(s) placed throughout the home, apartment, etc., turning them on, thereby illuminating the light bulb(s) of each emergency light device and providing an instant source(s) of light during a power outage. When the electrical power is restored and flowing into the main power box, the emergency light device power monitoring device 30 senses the electrical power has been restored and instantly sends a wireless communication to the emergency light device(s) to turn the emergency light device(s) off. As previously described, the emergency light device power monitoring device 30 can communicate wirelessly with the emergency light device main control device, which would then instantly wirelessly communicate with the emergency light device(s) as programmed by the owner of the emergency light device embodiments. Also illustrated in FIG. 6 is a microprocessor 32 or Nano processor 32, a microchip 33 or Nano chip 33, the wireless communication mechanism/unit 34, a memory mechanism 28, and one or more battery(ies) 35. The battery 35 may be rechargeable, non-rechargeable, or a combination of rechargeable and non-rechargeable batteries. The emergency light device power monitoring device 30 utilizes the microprocessor(s) 32 or Nano processor(s) 32 and microchip(s) 33 or Nano chip(s) 33, and memory mechanism 28, as the brains to perform its functions. Further illustrated in FIG. 6 are battery strength or power strength indicator lights 37 to indicate the power level of the battery(ies) 35. The emergency light device uses electrical current sensors/monitors, microprocessors, Nano processors, microchips, Nano chips, memory mechanism(s), rechargeable batteries, non-rechargeable batteries, and wireless communication technology, all of which are common knowledge to those familiar with the aforementioned.

Figure 7A:
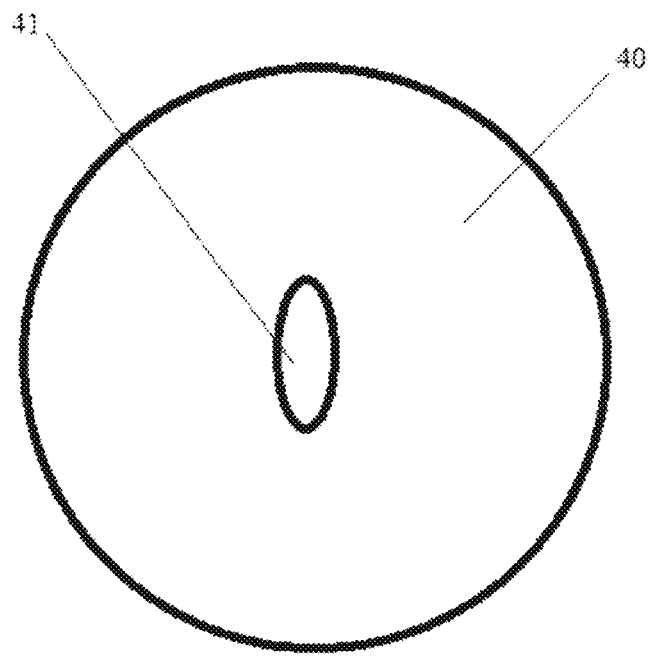
FIG. 7A shows a top view of an embodiment of a light enhancement disc that can be used with the emergency light devices described herein.
Figure 7B:
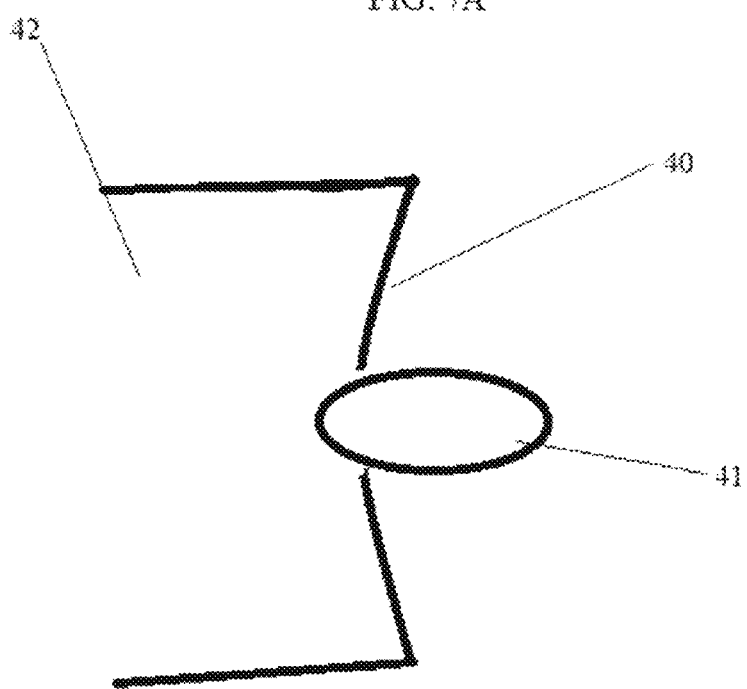
FIG. 7B shows a cutout side view of the light enhancement disc of FIG. 7A.

Illustrated in FIG. 7A is a top view of a reflective disc 40 that can be used with the emergency light devices, and a light bulb 41. The reflective disc 40 can be made of any reflective material. The reflective disc 40 can be made of a material that, when coated with a substance, becomes reflective. When the emergency light device is turned on, the light bulb 41 illuminates, and the reflective disc 40 placed under the light bulb 41 reflects the light of the light bulb 41, thereby intensifying and increasing the light being emitted by the light bulb 41. The composition of or materials used for reflection are common knowledge to those familiar with reflective physics and mechanics. Illustrated in FIG. 7B is a cutout side view of the top portion of the emergency light device 42, revealing the light bulb 41 and the reflective disc 40, both previously described. The angle, shape, and size of the reflective disc 40 can vary for maximum reflection of light.

Figure 8:
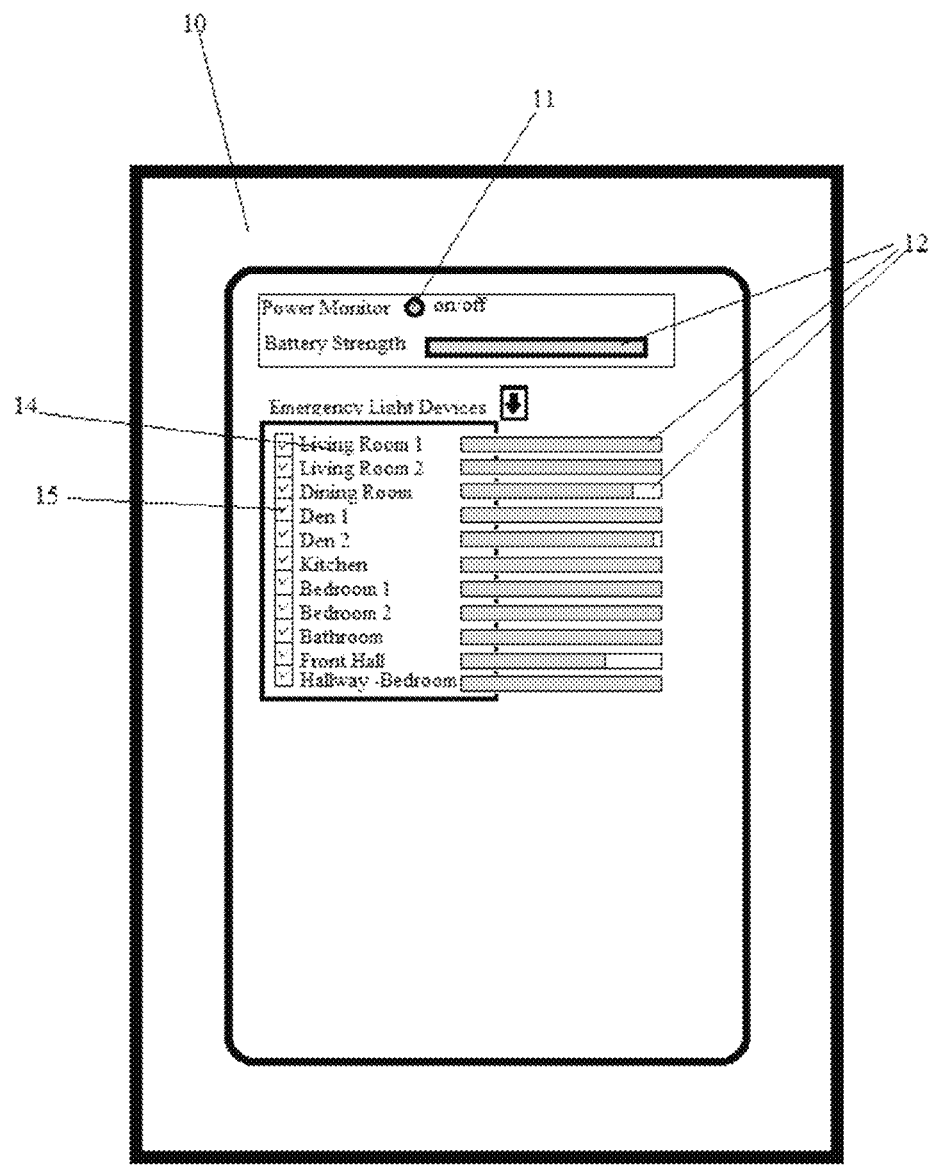
FIG. 8 shows an example of an embodiment of a display of a mobile device that can be used to control the emergency light devices described herein.

Shown in FIG. 8 is an example of a display screen 10 of a mobile device with a mobile application that can be used to monitor and/or remotely control the emergency light devices. Illustrated in FIG. 8 is the screen 10 showing the emergency light device power monitoring device on/off indicator light 11 that illuminates a green light to signify the emergency light device power monitoring device is on and monitoring/sensing the flow of electricity. There is a battery strength indicator(s) 12 that show the battery strength of each emergency light device, and the location of each emergency light device is shown with the location 14, and its corresponding battery strength 12. A person can select or deselect an emergency light device by checking the box 15. If the box 15 if checked, when there is a power outage, the selected emergency light device(s) will instantly turn on, as previously discussed.

Figure 9:
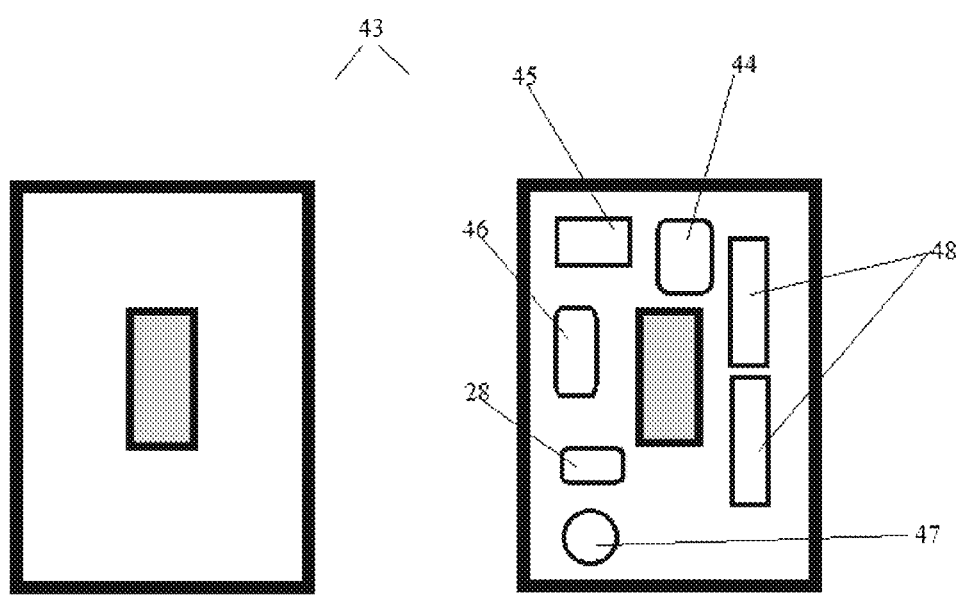
FIGS. 9A and 9B are front and back views respectively of an embodiment of the emergency light device wall switch device.

Shown in FIGS. 9A and 9B is an example of another embodiment of the ability of the emergency light device power monitoring device. In this embodiment, the monitoring of electricity flow is monitored at the wall switch, and if the flow of electricity is interrupted the wall switch will send a signal to activate the emergency light device(s). Illustrated in FIGS. 9A and 9B is an example of the front and back side of an embodiment of a wall switch. FIG. 9A is the front of the embodiment wall switch cover. FIG. 9B illustrates the back or inside of the emergency light device power monitoring wall switch device 43, with the electricity power sensor 44, micro/nano processor 45, micro/nano chip 46, wireless communication device 47, memory mechanism 28, and batteries 48. FIG. 9B is for illustrative purposes only and does not limit the emergency light device power monitoring wall switch device 43 to the examples described, or the number of, size of, location and configuration of the embodiments.

Shown in FIGS. 10A, 10B, and 10C are diagram illustration examples of the emergency light device system. FIG. 10A illustrates the emergency light power monitoring device 72 sensing the electricity is still flowing into the main power box 71 and therefore does not communicate with the emergency light devices 74. FIG. 10B illustrates a power outage with the emergency light device power monitoring device 72 sensing the electricity flow has been stopped and immediately wirelessly communicates 73 to the emergency light devices 74 to turn their lights on. FIG. 10C illustrates when the electricity has been restored and the emergency light device power monitoring device 72 immediately wirelessly communicates 73 with the emergency lights devices 74 to turn their lights off.

Shown in FIGS. 11A, 11B, and 11C are diagram illustration examples of the emergency light device system when a main control device is introduced. The emergency light device main control device 75 can be a stand-alone device specific to the emergency light device and has been previously described, and can include the use of computer or mobile device via software application(s). The system illustrated in FIGS. 11A, 11B, and 11C are similar to the embodiments shown in FIGS. 10A, 10B, and 10C, with the addition of the emergency light device main control device 75. The emergency light device main control device 75 allows a person to program, choose, and save the selections to specify which emergency light devices 74 to turn on when there is a power outage. When the electricity flow has stopped, the emergency light devices power monitoring device 72 instantly wirelessly communicates 73 with the emergency light device main control device 75, which instantly wirelessly communicates 73 with the specified emergency light devices 74 to turn their lights on. When the electricity is restored, the emergency light device power monitoring device 72 instantly wirelessly communicates 73 with the emergency light device main control device 75, which instantly wirelessly communicates 73 with the specified emergency light devices 74 to turn their lights off.

Shown in FIGS. 12A and 12B are diagram illustration examples of the emergency light device system with examples of one configuration of components within each embodiment. The system operates as previously described.

Shown in FIG. 13 is an example of one configuration of the emergency light device when used in recessed ceiling lighting. Illustrated in FIG. 13 is a cutout side view of a recessed light fixture 50, a recessed light bulb 51, two emergency light devices 52 that can be similar to those described herein, and the ceiling 53. The emergency light device(s) 52 operate as previously described.

Shown in FIG. 14A is an illustrative example of the emergency light device and system in a house, office, or other building. Illustrated in FIG. 14A is a main incoming electrical power source 55 as it enters the house and into a main electrical power box 56. Attached to the main electrical power box 56 is an emergency light device power monitoring device 57 similar to the embodiments previously described herein. Positioned throughout the house are emergency light devices 58 that can be similar to the embodiments previously described herein. The emergency light device power monitoring device 57 uses sensors to monitor the flow of electricity into the house.

Shown in FIGS. 14B and 14C is an illustrative example of the emergency light device and system in a house when a power outage occurs. Illustrated in FIG. 14B is the same house as shown in FIG. 14A, except the electrical power has just stopped flowing into the house, creating a brief moment of darkness. The emergency light device power monitoring device 57 immediately senses the electricity to the house has been disrupted and instantly wirelessly communicates with the emergency light devices 58 throughout the house to turn their lights on, illustrated in FIG. 14C. When the electricity is restored, the emergency light device power monitoring device 57 senses the electricity is restored and instantly wirelessly communicates with the emergency light devices 58 throughout the house to turn their lights off.

Shown in FIGS. 15A, 15B, and 15C is an illustrative example of the emergency light device and system in a one-floor apartment or other dwelling or office. Illustrated in FIG. 15A is a main electrical power box 60 for the apartment. Attached to the main electrical power box 60 is an emergency light device power monitoring device 61 similar to the embodiments previously described herein. Positioned throughout the apartment are emergency light devices 62 similar to the embodiments previously described herein. The emergency light device power monitoring device 61 uses sensors to monitor the flow of electricity into the apartment. Illustrated in FIG. 15B is the emergency light device power monitoring device 61 wirelessly communicating with the emergency light devices 62 throughout the apartment to turn their lights on because the electrical power to the apartment has been disrupted. Illustrated in FIG. 15C is the emergency light devices 62 turning their lights on. The aforementioned examples can also be used in a single level home or other structure and is not limited to the described examples.

Shown in FIGS. 16A and 16B is an illustrative example of the use of an emergency light device wall switch power monitoring device in an apartment. Illustrated in FIG. 16A is an emergency light device wall switch power monitoring device 65 and the emergency light devices 62. The emergency light device wall switch power monitoring device 65 does not interfere with the normal operation of the wall switch to turn the lights in the apartment on and off. The emergency light device wall switch power monitoring device 65 uses a sensor(s) to monitor the flow of electricity to the wall switch, and thusly the apartment, when the electrical power is disrupted, the emergency light device wall switch power monitoring device 65 instantly wirelessly communicates with the emergency light device(s) 62 in the apartment to turn their lights on, as illustrated in FIG. 16B. The emergency light device wall switch monitoring device can be used with an electrical switch in any location.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An emergency light system that provides illumination in a building during an interruption in electrical power to the building, comprising:

a power monitoring device that is electrically connected to electrical power of the building; the power monitoring device includes:
  a sensor that monitors a flow of electrical current of the electrical power, at least one battery, and a wireless communication mechanism electrically connected to the at least one battery and that can wirelessly transmit signals; and
an existing light fixture or lamp within the building;
at least one emergency light device mounted on the existing light fixture or lamp, the at least one emergency light device includes:
  a housing, at least one device battery, at least one light bulb mounted on the housing and electrically connectable to the at least one device battery, and a wireless communication mechanism electrically connected to the at least one device battery and that can wirelessly receive signals transmitted by the wireless communication mechanism of the power monitoring device;
at least one of the following:
  the at least one emergency light device at least partially overlaps a light bulb of the existing light fixture or the lamp or overlaps an exterior surface of a mounting for the light bulb of the existing light fixture or the lamp; the housing has a length that is less than a length of a light bulb of the existing light fixture or the lamp;
wherein when the sensor of the power monitoring device senses an interruption in the flow of electrical current, the wireless communication mechanism of the power monitoring device transmits a wireless signal that is received by the wireless communication mechanism of the at least one emergency light device, and the at least one light bulb is then illuminated.

2. The emergency light system of claim 1, wherein the power monitoring device is electrically connected to main electrical power entering the building; and the sensor monitors the flow of electrical current of the main electrical power.

3. The emergency light system of claim 1, wherein the at least one battery of the power monitoring device and the at least one device battery of the emergency light device are rechargeable.

4. The emergency light system of claim 1, wherein the at least one emergency light device includes an attachment mechanism mounted to the housing that removably attaches the at least one emergency light device to the existing light fixture or the lamp.

5. The emergency light system of claim 4, wherein the at least one emergency light device further includes at least one battery indicator light.

6. The emergency light system of claim 5, wherein the at least one emergency light device further includes a processor and memory.

7. The emergency light system of claim 1, wherein the power monitoring device further comprises at least one battery indicator light, a processor, and memory.

8. The emergency light system of claim 1, wherein the power monitoring device is mounted on a wall switch within the building.

9. The emergency light system of claim 1, comprising a plurality of the emergency light devices mounted within the building, each emergency light is mounted to a different existing light fixture or lamp.

10. The emergency light system of claim 1, wherein the wireless communication mechanism of the at least one emergency light device can wirelessly transmit signals.

11. The emergency light system of claim 1, further comprising an application that can be loaded onto a remote control device and that provides a user interface displayed on a display screen of the remote control device that displays a status of the emergency light system.

12. The emergency light system of claim 11, wherein the user interface displays an on/off status of the power monitoring device and a power level of the at least one device battery of the at least one emergency light device.

13. The emergency light system of claim 12, wherein the user interface further displays a location of the at least one emergency light device.

14. The emergency light system of claim 11, wherein the user interface allows a user to select the at least one emergency light device and thereby control whether or not the at least one emergency light device is controlled by the power monitoring device.

15. An emergency light device configured to be mountable on an existing light fixture or lamp within a building to provide light in an emergency, the emergency light device comprising:
  a housing that has a length that is less than a length of a light bulb of the existing light fixture or the lamp;
  at least one battery within the housing;
  at least one light bulb mounted on the housing and electrically connectable to the at least one battery; and
  a wireless communication mechanism electrically connected to the at least one battery and that can wirelessly receive and wirelessly transmit signals.

16. The emergency light device of claim 15, wherein the emergency light device includes an attachment mechanism mounted to the housing that can removably attach the emergency light device to the existing light fixture or the lamp.

17. The emergency light device of claim 16, wherein the emergency light device further includes at least one battery indicator light, a processor and memory.

18. A method of providing emergency lighting in a building, comprising:
  electrically connecting a power monitoring device to electrical power of the building; the power monitoring device includes a sensor that monitors a flow of electrical current of the electrical power, at least one battery, and a wireless communication mechanism electrically connected to the at least one battery and that can wirelessly transmit signals;
  mounting at least one emergency light device on an existing light fixture or lamp within the building so that the at least one emergency light device is adjacent to and at least partially overlaps a light bulb of the existing light fixture or the lamp, or overlaps an exterior surface of a mounting for the light bulb of the existing light fixture or the lamp, the at least one emergency light device includes a housing, at least one device battery, at least one light bulb mounted on the housing and electrically connectable to the at least one device battery, and a wireless communication mechanism electrically connected to the at least one device battery and that can wirelessly receive signals transmitted by the wireless communication mechanism of the power monitoring device;
  wherein when the sensor of the power monitoring device senses an interruption in the flow of electrical current, the wireless communication mechanism of the power monitoring device transmits a wireless signal that is received by the wireless communication mechanism of the at least one emergency light device, and the at least one light bulb is then illuminated.

19. The method of claim 18, further comprising mounting a plurality of the emergency light devices on different light fixtures or lamps within the building at different locations, with each emergency light device being controllable by the power monitoring device.

20. The method of claim 19, further comprising controlling operation of the emergency light devices via an application on a remote control device.

21. An emergency light system that provides illumination in a building during an interruption in electrical power to the building, comprising:
   a power monitoring device that is electrically connected to electrical power of the building; the power monitoring device includes:
     a sensor that monitors the flow of electrical current of the electrical power,
     at least one battery, and a wireless communication mechanism electrically connected to the at least one battery and that can wirelessly transmit signals; and
   at least one emergency light device mounted within the building, the at least one emergency light device includes:
     a housing, at least one device battery, at least one light bulb mounted on the housing and electrically connectable to the at least one device battery, and a wireless communication mechanism electrically connected to the at least one device battery and that can wirelessly receive signals transmitted by the wireless communication mechanism of the power monitoring device;
   wherein when the sensor of the power monitoring device senses an interruption in the flow of electrical current, the wireless communication mechanism of the power monitoring device transmits a wireless signal that is received by the wireless communication mechanism of the at least one emergency light device, and the at least one light bulb is then illuminated;
   an application that can be loaded onto a remote control device and that provides a user interface displayed on a display screen of the remote control device that displays a status of the emergency light system, the user interface allows a user to select the at least one emergency light device and thereby control whether or not the at least one emergency light device is controlled by the power monitoring device.

\* \* \* \* \*